(12) United States Patent
Chan et al.

(10) Patent No.: US 10,454,879 B2
(45) Date of Patent: *Oct. 22, 2019

(54) METHODS AND SYSTEMS FOR PROCESSING A DNS REQUEST

(71) Applicant: Pismo Labs Technology Limited, Kowloon (HK)

(72) Inventors: Alex Wing Hong Chan, Tai Tam (HK); Ho Ming Chan, Quarry Bay (HK); Kit Wai Chau, Kowloon (HK); Chi Pan Yip, Kowloon (HK); Min-Fu Tsai, Taipei (TW)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 5 days.

This patent is subject to a terminal disclaimer.

(21) Appl. No.: 15/912,372

(22) Filed: Mar. 5, 2018

(65) Prior Publication Data

US 2018/0262461 A1    Sep. 13, 2018

Related U.S. Application Data

(63) Continuation of application No. 14/410,107, filed as application No. PCT/IB2014/060891 on Apr. 22, 2014, now Pat. No. 9,912,630.

(51) Int. Cl.
*G06F 15/16* (2006.01)
*H04L 29/12* (2006.01)
(Continued)

(52) U.S. Cl.
CPC .......... *H04L 61/1511* (2013.01); *G06F 16/29* (2019.01); *H04L 12/4633* (2013.01);
(Continued)

(58) Field of Classification Search
CPC .......... G06F 17/30241; H04L 12/4633; H04L 12/6418; H04L 12/66; H04L 61/1511; H04L 61/2053; H04L 61/609
See application file for complete search history.

(56) References Cited

U.S. PATENT DOCUMENTS 5,777,989 A    7/1998  McGarvey
6,910,074 B1 *  6/2005  Amin ................. H04L 12/2856
                                                      709/227
(Continued)

FOREIGN PATENT DOCUMENTS

CN        101238453 A    8/2008
CN        101764855 A    6/2010
(Continued)

OTHER PUBLICATIONS

Andersen et al., ImprovingWeb Availability for Clients with MONET, http://nms.csail.mit.edu/ron/ronweb (Year: 2005).*
(Continued)

*Primary Examiner* — Moustafa M Meky
*Assistant Examiner* — Thorne E Waugh
(74) *Attorney, Agent, or Firm* — FisherBroyles LLP

(57) ABSTRACT

A method and system for processing Domain Name Services (DNS) request in a gateway. The gateway receives a DNS request from a host from its local area network. The gateway then selects DNS server(s) and transmits a new DNS request to at least one DNS server(s). DNS server(s) may or may not be accessible through a first tunnel. The contents of the new DNS request are the same as the content of the received DNS request. Further, when the gateway receives a DNS response corresponding to the DNS request, it determines a decision whether to transfer data to the host whose IP
(Continued)

address is specified in the DNS response through a second tunnel. The decision may be based on a geographical location of an IP address.

20 Claims, 15 Drawing Sheets

(51) Int. Cl.
| | | |
|---|---|---|
| *G06F 16/29* | (2019.01) | |
| *H04L 12/64* | (2006.01) | |
| *H04L 12/46* | (2006.01) | |
| *H04L 12/66* | (2006.01) | |

(52) U.S. Cl.
CPC ......... *H04L 12/6418* (2013.01); *H04L 12/66* (2013.01); *H04L 61/2053* (2013.01); *H04L 61/609* (2013.01)

(56) References Cited

U.S. PATENT DOCUMENTS

| | | | | |
|---|---|---|---|---|
| 6,917,610 | B1* | 7/2005 | Kung | H04Q 3/0045 370/352 |
| 6,937,713 | B1* | 8/2005 | Kung | H04M 3/54 379/199 |
| 7,099,957 | B2 | 8/2006 | Cheline et al. | |
| 7,254,643 | B1* | 8/2007 | Peters, Jr. | H04L 29/1216 709/227 |
| 7,296,155 | B1 | 11/2007 | Trostle et al. | |
| 7,359,395 | B2* | 4/2008 | Toporek | H04B 7/2126 370/401 |
| 7,366,188 | B2* | 4/2008 | Kim | H04L 12/4633 370/401 |
| 7,496,054 | B2* | 2/2009 | Taylor | H04M 7/006 370/255 |
| 7,734,683 | B1 | 6/2010 | Bergenwall et al. | |
| 7,933,976 | B2* | 4/2011 | Ganesh | G06F 9/5077 707/609 |
| 7,991,854 | B2 | 8/2011 | Bahl | |
| 8,386,603 | B2* | 2/2013 | Arashin | H04L 29/12264 370/338 |
| 8,667,176 | B2* | 3/2014 | Zhang | H04L 12/66 709/241 |
| 8,850,526 | B2* | 9/2014 | Jayaraman | G06F 21/51 713/165 |
| 9,118,603 | B2* | 8/2015 | Miller | H04L 47/70 |
| 9,300,622 | B2* | 3/2016 | Yuan | H04L 61/10 |
| 2003/0012183 | A1* | 1/2003 | Butler | H04L 12/6418 370/352 |
| 2003/0195984 | A1 | 10/2003 | Zisapel et al. | |
| 2004/0139170 | A1* | 7/2004 | Shen | H04L 12/2856 709/218 |
| 2004/0249973 | A1 | 12/2004 | Alkhatib et al. | |
| 2005/0044234 | A1 | 2/2005 | Coughlin | |
| 2005/0066041 | A1 | 3/2005 | Chin et al. | |
| 2005/0208947 | A1 | 9/2005 | Bahl | |
| 2006/0174001 | A1* | 8/2006 | Zhu | H04L 63/1416 709/225 |
| 2006/0259625 | A1 | 11/2006 | Landfeldt et al. | |
| 2008/0140847 | A1 | 6/2008 | Almog | |
| 2009/0287955 | A1 | 11/2009 | Matsumoto et al. | |
| 2010/0054222 | A1 | 3/2010 | Rune | |
| 2010/0121981 | A1 | 5/2010 | Drako | |
| 2011/0173339 | A1 | 7/2011 | Zhang | |
| 2013/0029708 | A1 | 1/2013 | Fox et al. | |
| 2013/0080629 | A1* | 3/2013 | Aboughanaima | H04L 29/12066 709/224 |
| 2013/0166715 | A1* | 6/2013 | Yuan | H04L 12/4633 709/223 |
| 2013/0198385 | A1* | 8/2013 | Han | H04L 43/0817 709/226 |
| 2013/0254425 | A1* | 9/2013 | Broerman | H04L 61/1511 709/238 |
| 2015/0365441 | A1* | 12/2015 | Lemon | G06F 16/90335 726/1 |

FOREIGN PATENT DOCUMENTS

| | | |
|---|---|---|
| CN | 101841577 A | 9/2010 |
| CN | 102104634 A | 6/2011 |
| CN | 102404416 A | 4/2012 |
| CN | 103236964 A | 8/2013 |
| JP | 2005184110 A | 7/2005 |
| WO | 2005029282 A2 | 3/2005 |

OTHER PUBLICATIONS

Networking 101: Understanding Tunneling, http://www.enterprisenetworkingplanet.com/netsp/article.php/3624566/Networking-101-Understanding-Tunneling.htm (Year: 2011).*
Andersen et al., Improving Web Availability for Clients with MONET, http://nms.csail.mit.edu/ron/ronweb, 2005.
Networking 101: Understanding Tunneling, http://www.enterprisenetworkingplanet.com/netsp/article.php/3624566/Networking-101-Understanding-Tunneling.htm, Dec. 30, 2011.
Mockapetris, "RFC1034: Domain Names—Concepts and Facilities," Network Working Group, Nov. 1987.
Mockapetris, "RFC1035: Domain Names—Implementation and Specification," Network Working Group, Nov. 1987.
Vulimiri et al., "More is Less: Reducing Latency via Redundancy," Proceedings of the 11th ACM Workshop on Hot Topics in Networks, Oct. 29-30, 2012, pp. 13-18.
English language Abstract of CN 101238453 A (Aug. 6, 2008).
English language Abstract of CN 101764855 A (Jun. 30, 2010).
English language Abstract of CN 101841577 A (Sep. 22, 2010).
English language Abstract of CN 102104634 A (Jun. 22, 2011).
English language Abstract of CN 102404416 A (Apr. 4, 2012).
English language Abstract of CN 103236964 A (Aug. 7, 2013).
English language Abstract of JP 2005184110 A (Jul. 7, 2005).
Office Action in related Chinese Application No. 201280076839.2, dated Jun. 13, 2017.
Office Action in related Chinese Application No. 201480009088.1, dated Mar. 19, 2018.
International Search Report in International Application No. PCT/IB2012/056153, dated Aug. 15, 2013.
Written Opinion of the International Searching Authority in International Application No. PCT/IB2012/056153, dated Aug. 15, 2013.
International Search Report in International Application No. PCT/IB2014/060891, dated Jan. 26, 2015.
Written Opinion of the International Searching Authority in International Application No. PCT/IB2014/060891, dated Jan. 26, 2015.

* cited by examiner

METHODS AND SYSTEMS FOR PROCESSING A DNS REQUEST

RELATED APPLICATIONS

The present application is a Continuation application which claims the benefits of and is based on application Ser. No. 14/410,107 filled on 22 Dec. 2014, which further claims the benefits of and is based on PCT application Ser. No. PCT/IB2014/060891 filled on 22 Apr. 2014, which are hereby incorporated by reference.

TECHNICAL FIELD

The present invention relates in general to the field of computer networks. More particularly, the present invention relates to methods and systems for processing a Domain Name Services (DNS) request in a gateway. The gateway determines a decision whether to use a second tunnel for transferring data to a second host based on the geographical location of an Internet Protocol (IP) address of the second host, wherein the IP address of the second host is specified in a first DNS response.

BACKGROUND ART

The Domain Name System (DNS) is a hierarchical distributed naming system for computers, services, or any resource connected to the Internet or a private network. It associates various types of information with domain names assigned to each of the participating entities. A DNS resolves request for these names into Internet Protocol (IP) addresses for the purpose of locating computer services and devices worldwide. Different DNS servers may resolve a particular DNS request differently, for example, due to content distribution network, administrator's intervention, and whether a DNS server is being comprised. In another example, a DNS server located in Country A may not provide an accurate IP address for websites that are restricted in Country A due to political reasons or legislations. It is commonly known that an IP address for a website that is restricted in Country A may not be accessible by a host or gateway located in Country A. It is also common that the geographical locations of IP addresses for websites restricted in Country A are most likely to be outside country A. To overcome this, IP packets for IP addresses can be sent or received through a tunnel, such as a virtual private network (VPN) connection. One of the techniques is to set up rules or policies at a gateway to have data destined to the restricted IP addresses, domain names and/or websites through the tunnel or VPN. It may become very inconvenient for an administrator to set up the rules and policies if there are many restricted IP addresses, domain names and/or websites, particularly if it is unknown what are being restricted.

SUMMARY

The present invention discloses methods and systems for processing Domain Name Service (DNS) request in a gateway comprising at least one local area network (LAN) interface and at least one wide area network (WAN) interface. The gateway receives a first DNS request from a first host via one of the at least one LAN interface of the gateway. The gateway selects at least one DNS server. If the at least one DNS server is accessible through at least one tunnel, at least one new DNS request is transmitted to the at least one DNS server through the at least one tunnel. Alternatively, if the at least one DNS server is not accessible through any tunnel, the at least one new DNS request is transmitted to the at least one DNS server without using a tunnel. The at least one new DNS request is based on the first DNS request, such that contents of the at least one new DNS request are the same as the content of the first DNS request.

According to one of the embodiments of the present invention, the step of selecting the at least one DNS server comprises determining one or more DNS servers that are accessible by the gateway through at least one tunnel. The gateway then selects the at least one DNS server from the one or more DNS servers.

According to one of the embodiments of the present invention, the method for processing DNS request in the gateway further comprises the gateway receiving a first DNS response from the at least one DNS server. The gateway then transmits a new DNS response to the host via the one of the LAN interfaces of the gateway. The new DNS response is based on the first DNS response. The gateway determines the geographical location of an IP address specified in the first DNS response by using an IP geolocation database and determines a decision whether to transfer data between the first host and a second host using a second tunnel. The second host is accessible through the IP address specified in the first DNS response. The gateway transfers data between the first host and the second host using the second tunnel if the decision is to use the second tunnel. Alternatively, if the decision is to not use the second tunnel or if there is no decision, the gateway transfers data between the first host and the second host not using the second tunnel.

According to one of the embodiments of the present invention, the first DNS response is received through a first tunnel. The first tunnel is one of the at least one tunnel used to transmit the at least one new DNS request. In one variant, the first tunnel is the same as the second tunnel. Alternatively, the first tunnel is not the same as the second tunnel.

According to one of the embodiments of the present invention, the second tunnel is further used for transferring data between the gateway and the second host if the gateway determines to use the second tunnel.

According to one of the embodiments of the present invention, the step of determining whether to transfer data between the gateway and the second host or between the first host and the second host is based on the geographical location of the IP address specified in the first DNS response.

According to one of the embodiments of the present invention, the number of the at least one new DNS request is at least two, such that at least two new DNS requests are transmitted by the gateway. A plurality of DNS responses are received at the gateway and a first DNS response is selected from the plurality of DNS responses. If at least one DNS response is received through the at least one tunnel, the first DNS response is selected from the at least one DNS response received through the at least one tunnel. Alternatively, if no DNS response is received through any of the at least one tunnel, the first DNS response is selected from the plurality of DNS responses received. The plurality of DNS responses may be received within a predefined time period.

According to one of the embodiments of the present invention, the step of determining whether to transfer data between the gateway and the second host or between the first host and the second host is based on whether IP addresses specified in at least two of the plurality of DNS responses are the same.

According to one of the embodiments of the present invention, the decision whether to transfer data between the first host and the second host is stored in a computer readable storage medium. The decision is deleted from the computer readable storage medium when a time period specified in a time-to-live (TTL) field of the first DNS response has expired.

According to one of the embodiments of the present invention, the decision whether to transfer data between the first host and the second host is stored in a computer readable storage medium. The decision contains the IP address specified in the first DNS response. When a time period specified in a TTL field of the first DNS response has expired, a second at least one new DNS request is transmitted to at least one DNS server. A second DNS response corresponding to the second at least one new DNS request is received. The IP address in the decision is then updated to an IP address specified in the second DNS response.

DETAILED DESCRIPTION

Figure 1A:
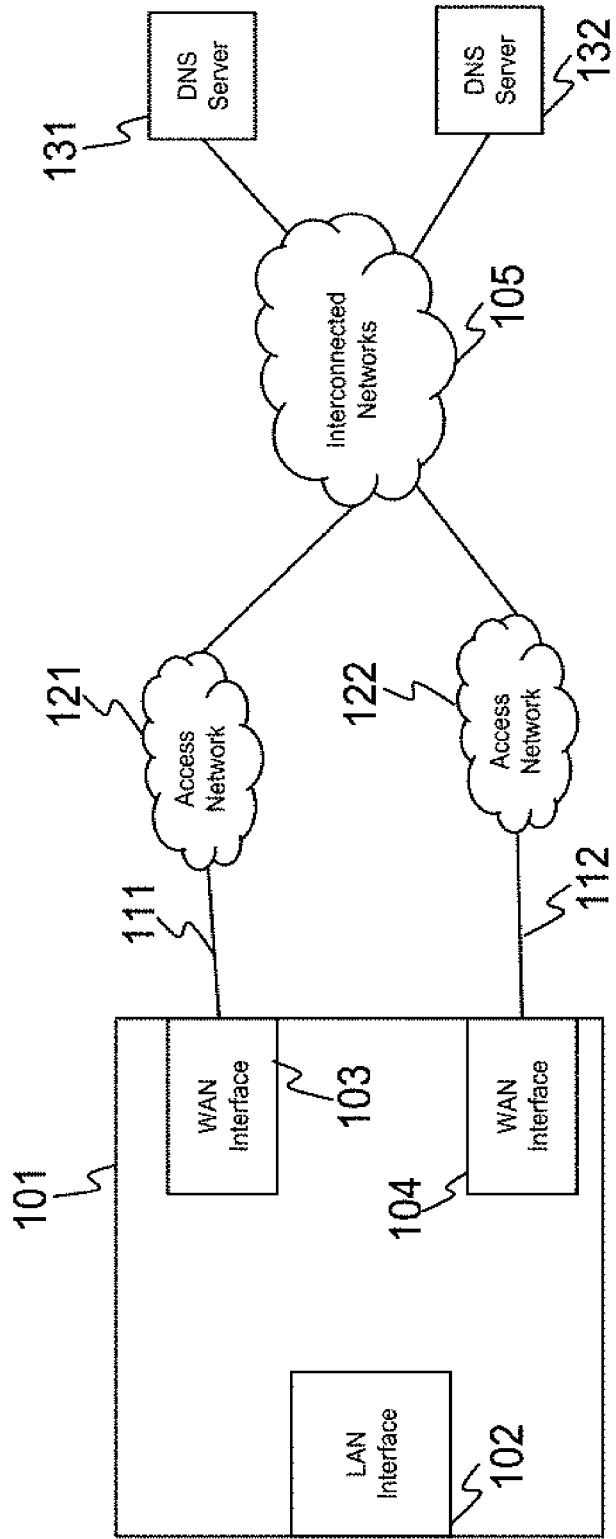
FIG. 1A illustrates a network environment in which hosts and DNS servers may connect to the gateway in accordance with one of the embodiments of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "computer readable storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "computer readable storage medium" may also include but is not limited to portable or fixed storage devices, optical storage mediums, magnetic mediums, memory chips or cartridges, wireless channels and various other mediums capable of storing, containing or carrying instruction(s) and/or data. A computer readable storage medium can be realized by virtualization and can be a virtual computer readable storage medium including a virtual computer readable storage medium in a cloud-based instance.

The term computer-readable medium as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable storage medium. A processing unit(s) may perform the necessary tasks. A processing unit(s) can be realized by virtualization and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hardwired circuitry may be used in place of or in combination with software instructions to implement the invention. Thus, embodiments of the invention are not limited to any specific combination of hardware circuitry and software.

A code segment or program instruction may represent a procedure, a function, a subprogram, a program, a routine, a subroutine, a module, a software package, a class, or any combination of instructions, data structures, or program statements. A code segment may be coupled to another code segment, a program instruction or a hardware circuit by passing and/or receiving information, data, arguments, parameters, or memory contents. Information, arguments, parameters, data, etc. may be passed, transmitted, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

An access network allows the gateway to connect to other networks, such as the Internet and the extranet. To determine whether a network is accessible or not, the gateway may periodically send out packets to test accessibility. For example, the gateway may transmit an ICMP echo request packet to a host and measure the arrival time of the ICMP echo reply packet to determine whether the network is accessible. It would be apparent to those skilled in the art that many more methods and techniques can be used to determine whether a network is accessible.

A presently preferred embodiment of the present invention may utilize a gateway. A gateway is a device or a node on a network which performs protocol conversion between different types of networks or applications and capable of processing DNS requests and responses. The term gateway is not meant to be limited to a single type of device, as any device, hardware or software, that may act as a bridge between the user and the networks may be considered a gateway for purposes of this application. The gateway may couple with a plurality of multiple networks. A router, a switch, a bridge, a wireless access point, a virtual machine in a computing device or any apparatus capable of acting as an access point to another network and handling DNS requests and responses may all be considered as a gateway for purposes of this invention.

A network interface may be implemented by a standalone electronic component or may be integrated with other electronic components. A network interface may have no network connection or at least one network connection depending on the configuration. A network interface is only connected to one access network. Therefore, there may be more than one network connection being carried by one access network. A network interface may be an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infra-red, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies.

An access network may carry one or more network protocol data, including but not limited to Internet Protocol (IP), IPv4, or IPv6. An access network may be a wired network or a wireless network. An accessible wireless network may be implemented using optical fiber, cables, or any material that can pass information. An accessible wireless network may also be implemented using infra-red, Ethernet, DSL, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO or any other wireless technologies.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, local area network (LAN), metropolitan area network (MAN), wide area network (WAN), the PSTN, a satellite communication system, a cable transmission system, and/or the like.

FIG. 1A illustrates a network environment in accordance with one of the embodiments of the present invention. Gateway 101 has one local area network (LAN) interface 102 and two wide area network (WAN) interfaces 103 and 104 respectively. Two access networks 121 and 122 are connected to WAN interfaces 103 and 104 via network link 111 and 112 respectively. Therefore, gateway 101 has two access networks for connecting to interconnected networks 105, which can be the Internet. Access networks 121 and 122 may be provided by the same or different Internet Service Providers (ISPs). For example, access network 121 connected to WAN interface 103 may be provided by Verizon using DSL technology and access network 122 connecting to WAN interface 104 may be provided by Sprint using LTE technology. DNS servers 131 and 132 are accessible by gateway 101 via WAN interface 103 and 104.

When gateway 101 receives a first DNS request from a sender via LAN interface 102, it selects at least one DNS server, such as DNS Server 131 or 132, and at least one access network for transmitting a plurality of new DNS requests. The sender may be a host, a node in a network, a computing device, a network device, a mobile phone, a tablet, a desktop computer, a laptop computer, a meter, a video camera, an audio record, a sound receiver, a video display, a sensor or any electronic device capable of sending DNS request. The first DNS request may be for querying gateway 101 for information related to a domain name. In one variant, when gateway 101 has the information to answer the first DNS request, gateway 101 replies to the first DNS request without transmitting the first DNS request to other DNS servers.

The new DNS requests have the same contents as contained in the first DNS request. In one example, when the first DNS request is for resolving IP address of a domain name "happy.com", all new DNS requests are for resolving IP address of the same domain name "happy.com". In one example, when the first DNS request is to query resource record by type of a domain name "happy.com", all new DNS requests are to query resource record by type of the same domain name "happy.com". In one example, when the first DNS request is to query the mail exchange (MX) record by of "yahoo.com", all new DNS requests are to query the MX record of "yahoo.com". For each selected DNS server, gateway 101 transmits a new DNS request to it via one of the selected access networks. Therefore, gateway 101 may transmit more than one new DNS requests to a selected DNS server through two different selected access networks. Also, gateway 101 may transmit a plurality of new DNS requests to different selected DNS servers. However, gateway 101 only transmits one new DNS request to one selected DNS server through one selected access network. Gateway 101 does not transmit more than one new DNS request to the same selected DNS server through the same selected access network unless for retransmitting the new DNS request. This is because the performance improvement and reliability improvement by sending more than one new DNS request to the same selected DNS server through the same selected access network is minimal.

As gateway 101 can connect to both DNS server 131 and 132 via access networks 121 and 122 by using WAN interface 103 and 104 respectively, gateway 101 has four alternatives to transmitting the new DNS requests. The first alternative is to transmit one of the new DNS requests to DNS Server 131 via access network 121 and via WAN interface 103. The second alternative is to transmit one of the new DNS requests to DNS Server 131 via access network 122 and via WAN interface 104. The third alternative is to transmit one of the new DNS requests to DNS Server 132 via access network 121 and via WAN interface 103. The fourth alternative is to transmit one of the new DNS requests to DNS Server 132 via access network 112 and via WAN interface 104. Gateway 101 selects at least two of the four alternatives to transmit the new DNS requests. The benefits of using more than one alternative to transmit the new DNS requests includes increasing the speed of resolving the first DNS request and increasing the reliability of resolving the first DNS request.

Figure 1B:
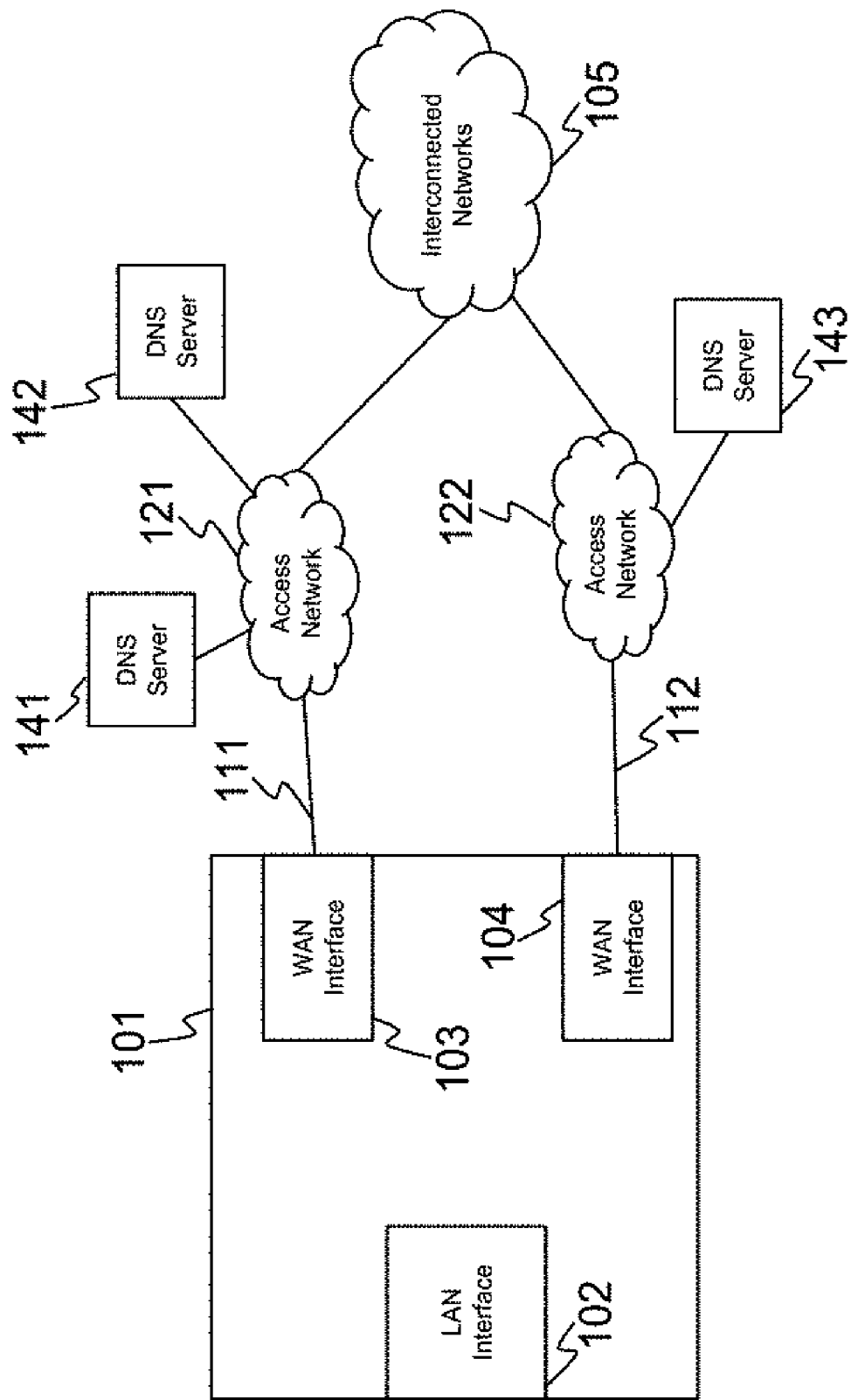
FIG. 1B illustrates a network environment in which hosts and DNS servers may connect to the gateway in accordance with one of the embodiments of the present invention.

FIG. 1B illustrates a network environment in accordance with one of the embodiments of the present invention. FIG. 1B is different from FIG. 1A that access network 121 is connected to DNS server 141 and 142 directly without passing through interconnected networks 105 and access network 122 is connected to DNS server 143 directly without passing through interconnected networks 105. In addition, DNS server 141 and 142 are restricted for hosts connecting to access network 121 and DNS server 143 is restricted for hosts connecting to access network 122. Therefore, gateway 101 cannot access DNS server 143 via WAN interface 103 and cannot access DNS server 141 and 142 via WAN interface 104. When gateway 101 has selected one or more DNS servers for resolving DNS request, gateway 101 will then determine which WAN interface is used to transmit the one or more new DNS requests. Alternatively, when gateway 101 has selected one or more WAN interfaces for transmitting the one or more new DNS requests, gateway 101 will then determine which DNS servers will be used for solving the new DNS requests.

A new DNS request has the same content or query contained in the first DNS request. For illustration purpose, when the first DNS request is for resolving IP address of a domain name "happy.com", all new DNS requests are for resolving IP address of the same domain name "happy.com". For each of selected DNS servers, gateway 101 transmits one of the new DNS requests to it via one of the selected access networks. Therefore, gateway 101 may transmit more than one new DNS request to a selected DNS server through two different selected access networks. Also, gateway 101 may transmit a plurality of new DNS requests to different selected DNS servers. However, gateway 101 only transmits one new DNS request to one selected DNS server via one selected access network. Gateway 101 does not transmit more than one new DNS request to the same selected DNS server through the same selected access network. This is because the performance improvement and reliability improvement by sending more than one new DNS request to the same selected DNS server through the same selected access network is minimal.

Transmitting DNS Requests

Figure 2:
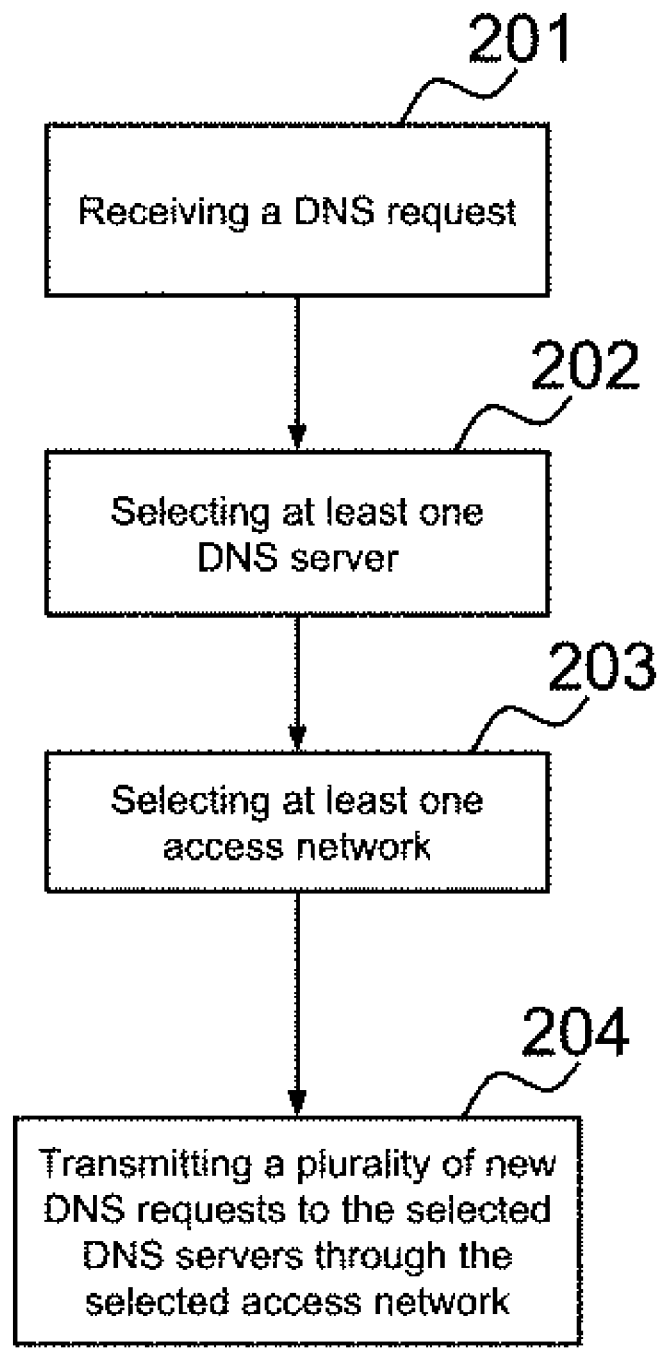
FIG. 2 is a flowchart illustrating a process of processing a received DNS request in accordance with one of the embodiments of the present invention.

FIG. 2 is a flowchart illustrating the steps of one of the embodiments of the present invention. To illustrate the embodiment, FIG. 1A is used in conjunction with FIG. 2. When a gateway receives a first DNS request at step 201 via LAN interface 102, gateway 101 selects at least one DNS server at step 202 and selects at least one access network at step 203. The DNS servers available for selection may be configured by the administrator of the gateway manually, provided by the service provider of an access network, retrieved from a storage system of the gateway, or obtained from a DHCP message.

When gateway 101 selects DNS server 131 or 132, gateway 101 also selects an access network 121 or 122 that is authorized to send the new DNS request to that selected DNS server, because some DNS servers only respond to DNS requests that are originated from authorized IP addresses. In one variant, gateway 101 selects at least one DNS server at step 202 and selects at least one access network at step 203 randomly, according to a pre-defined policy. In one example, the pre-defined policy is to select the DNS server and access network based on configuration entered by the gateway administrator. In one example, the pre-defined policy is to select the DNS server and access network based on availability. In one example, the pre-defined policy is to select the DNS server and access network based on configuration entered by the gateway administrator. In one example, the pre-defined policy is to select the DNS server and access network based on statistical analysis of DNS responses received from the DNS server via the accessible networks. In one example, the pre-defined policy is to select the DNS server and access network based on historical average DNS response speed with valid respond code.

For illustrative purpose, gateway 101 selects DNS Server 131 via access network 121 and via WAN interface 103, DNS Server 131 via access network 122 and via WAN interface 104, and DNS Server 132 via access network 121 and via WAN interface 103. Therefore, at step 204, gateway 101 creates three new DNS requests and then transmits a new DNS request to DNS Server 131 via WAN interface 103, another new DNS request to DNS Server 131 via WAN interface 104 and another new DNS request to DNS Server 132 via WAN interface 103.

At step 204, the new DNS requests are transmitted to the selected DNS servers through the selected access networks.

According to one of the embodiments of the present invention, the order of performing step 202 and step 203 may be interchanged or merged as a single step.

In one of the embodiments of the present invention, FIG. 2 also illustrates the steps of the embodiments in conjunction with FIG. 1B. DNS servers 141 and 142 are only accessible through access network 121. DNS server 143 is only accessible through access network 122.

When a gateway receives a first DNS request at step 201 via LAN interface 102, gateway 101 selects at least one DNS server at step 202 and selects at least one access network at step 203. The DNS servers available for selection may be configured by the administrator of the gateway manually, provided by the service provider of an access network, retrieved from a storage system of the gateway, or obtained from a DHCP message.

When gateway 101 selects DNS server 141 or 142, gateway 101 uses access network 121 to send the new DNS request to the selected DNS server. When gateway 101 selects DNS server 143, gateway 101 uses network 121 to send the new DNS request to the DNS server 143.

For illustrative purpose, gateway 101 selects DNS Server 141 and 143. Therefore, at step 204, gateway 101 creates two new DNS requests and then transmits a new DNS request to DNS Server 141 via WAN interface 103, and another new DNS request to DNS Server 143 via WAN interface 103.

At step 204, the new DNS requests are transmitted to the selected DNS servers through the selected access networks.

According to one of the embodiments of the present invention, the order of performing step 202 and step 203 may be exchanged or merged as a single step.

According to one of the embodiments of the present invention, when there are n number of DNS servers and m number of access networks, there are altogether n times m available combinations of DNS servers and access networks. The gateway selects at least two of such combinations of DNS servers and access networks for transmitting a plurality of new DNS requests. Therefore, when the gateway only selects one DNS server, the gateway selects at least two access networks; when the gateway only selects one access network, the gateway selects at least two DNS servers. The new DNS requests correspond to the first DNS request, such that the queries of the new DNS requests are the same as the query of the first DNS request. It would be apparent to those skilled in the art that many more methods and techniques may be used to create the new DNS requests according to the query of the first DNS request.

Figure 6A:
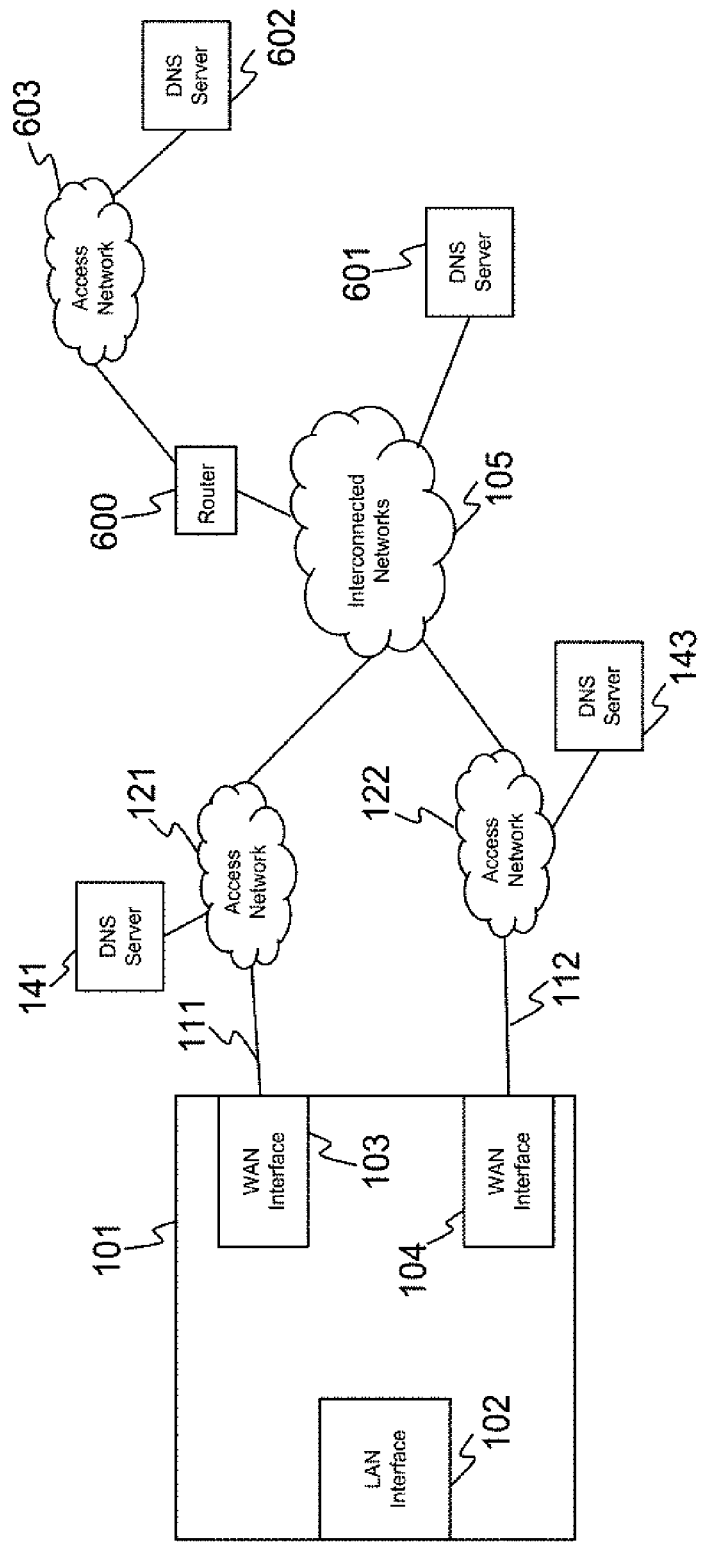
FIG. 6A is a block diagram representing the network environment according to one of the embodiments of the present invention.

According to one of the embodiments of the present invention, viewing FIG. 2 in conjunction with FIG. 6A, at least one of the at least one DNS server in step 202 is accessible through a VPN connection. For example, a plurality of DNS servers including DNS servers 141, 143, 601 and 602 are selected in step 202. At least one of the plurality of DNS servers, such as DNS server 602 is accessible through a VPN connection established between gateway 101 and router 600. Gateway 101 may establish a VPN connection with router 600 though either one of WAN interfaces 103 and 104 or may also establish an aggregated VPN connection by combining VPN connections established through WAN interfaces 103 and 104. When a plurality of DNS servers are selected, their corresponding access networks and VPN connections are selected in step 203. A plurality of new DNS requests are then transmitted to the plurality of DNS servers in step 204. At least one of the plurality of new DNS requests is transmitted through at least one VPN connection.

Receiving DNS Response

According to one of the embodiments of the present invention, after the new DNS requests are transmitted, gateway 101 may receive none, one or more DNS responses in response to the new DNS requests from the selected DNS servers, such as DNS server 131 and 132. Gateway 101 can transmit one, more than one new DNS responses to the sender of the first DNS request. The sender of the first DNS request is host, which sends a DNS request to gateway 101 via LAN interface 102. A new DNS response transmitted by the gateway contains the same response from the DNS response received by the gateway 101.

A received DNS response is considered valid when it has a return code (RCODE) of zero. It would be apparent to those skilled in the art that the Internet Assigned Numbers Authority has assigned different meanings for different RCODE. It would also be apparent to those skilled in the art that many more methods and techniques can be used to process other DNS responses when a DNS response has already been transmitted to the sender of the first DNS request.

Figure 3:
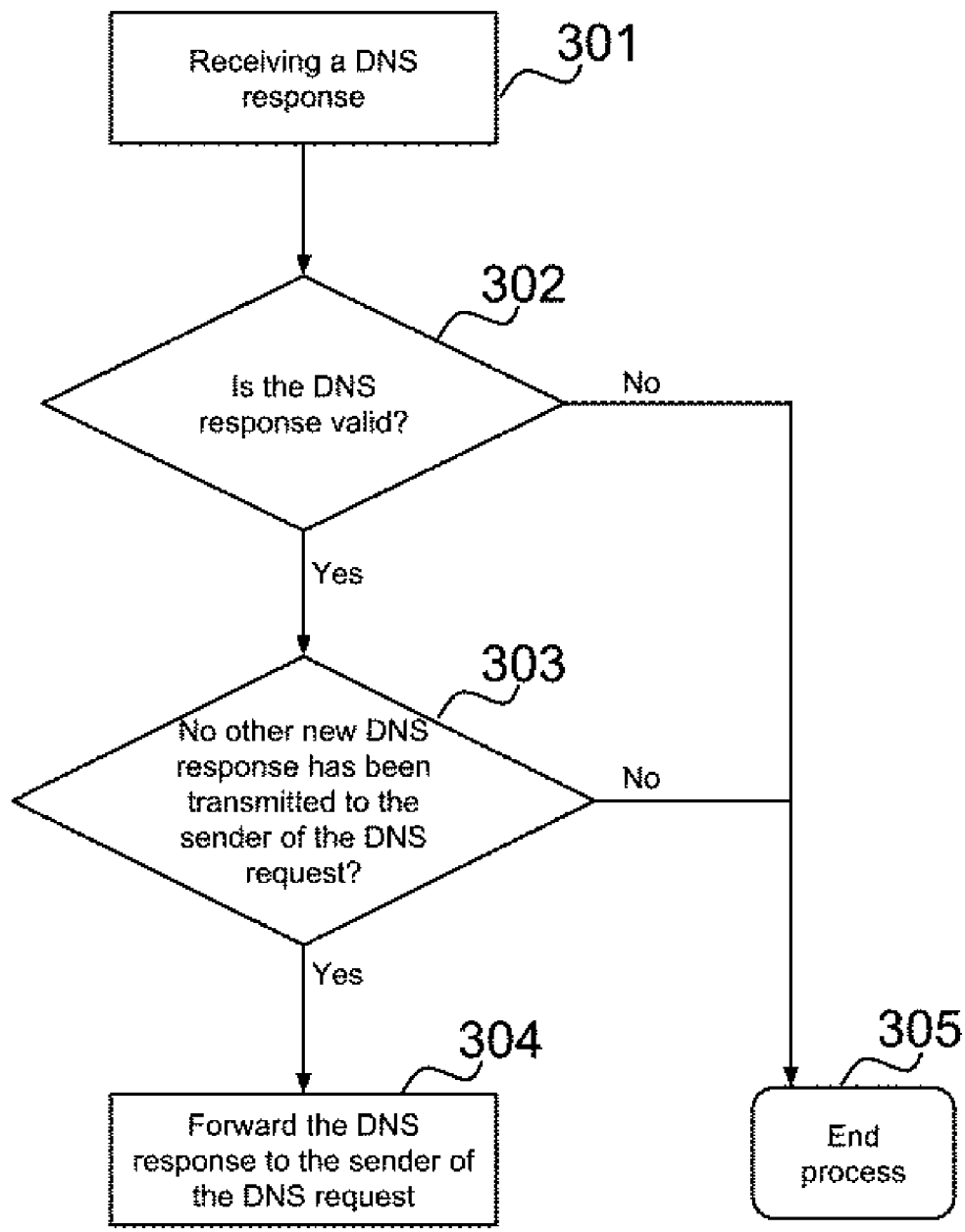
FIG. 3 is a flowchart illustrating a process of processing a received DNS response in accordance with one of the embodiments of the present invention.

FIG. 3 is a flowchart illustrating one of the embodiments of the present invention. To illustrate the embodiment, FIG. 1A is used in conjunction with FIG. 3. Gateway 101 receives a DNS response at step 301 from one of DNS server 131 and 132. Gateway 101 forwards a new DNS response to the sender of the first DNS request at step 304 only when the DNS response received by gateway 101 is confirmed valid at step 302 and no other new DNS response has been transmitted to the sender of the first DNS request before at step 303. Therefore, the sender of the first DNS request only receives one new DNS response for the first DNS request it sent earlier. If other DNS responses have been received by the gateway later, the gateway discards these Received DNS responses at step 305.

In the forwarding performed at step 304, gateway 101 creates a new DNS response and transmits the new DNS response to the sender of the first DNS request. The content of the new DNS response is the same as the content in the DNS response received at 301. For example, the value of the RCODE in the new DNS response transmitted to the sender of the first DNS request is the same as the RCODE of one of the DNS responses.

If there is one or more invalid DNS responses received by gateway 101 before the first valid DNS response is received, the one or more invalid DNS responses are discarded after the new DNS response is transmitted to the sender of the first DNS request.

According to one of the embodiments of the present invention, when no DNS response corresponding to the new DNS requests has been received by gateway 101 within a pre-defined time period, gateway 101 transmits a new DNS response with a non-zero RCODE to the sender of the first DNS request. The value of the pre-defined time period may be determined by the manufacturer of the gateway, the administrator of the gateway, and/or by the host. In one variant, the pre-defined time period is in the range of one hundred milliseconds to twenty seconds. The reason why no DNS response is received by gateway 101 after a pre-defined period of time may be that no received DNS responses has a RCODE of zero or no DNS response has been received from any of selected DNS servers.

According to one of the embodiments of the present invention, when gateway 101 has received more than one DNS response and none of these received DNS responses are considered valid before the pre-defined timeout, gateway 101 has to determine how to respond to the sender of the first DNS request. According to one of the embodiments of the present invention, gateway 101 transmits a new DNS response to the sender of the first DNS request with the contents retrieved from one of the received DNS responses. In one variant, for example, the RCODE in the DNS response transmitted to the sender of the first DNS request is the majority of the RCODE contained in all DNS responses received by gateway 101. In one variant, the RCODE in the DNS response transmitted by gateway 101 to the sender of the first DNS request is chosen randomly from one of the DNS responses received by gateway 101.

According to one of the embodiments of the present invention, when gateway 101 has received all DNS responses corresponding to all new DNS requests and none of these DNS responses are considered valid, gateway 101 transmits a new DNS response to the sender of the first DNS request. The content of the new DNS response is selected from one of the received DNS responses. The selection can be determined randomly, statistically, according to the time of receiving or according to the order of receiving.

According to one of the embodiments of the present invention, when gateway 101 has received all DNS responses corresponding to all new DNS requests and none of these DNS responses are considered valid, gateway 101 transmits a new DNS response to the sender of the first DNS request. The content of the new DNS response is selected from one of the received DNS responses. The selection, of which of the received DNS responses the new DNS response should be selected from, can be determined randomly, statistically, according to the time of receiving or according to the order of receiving.

Figure 4:
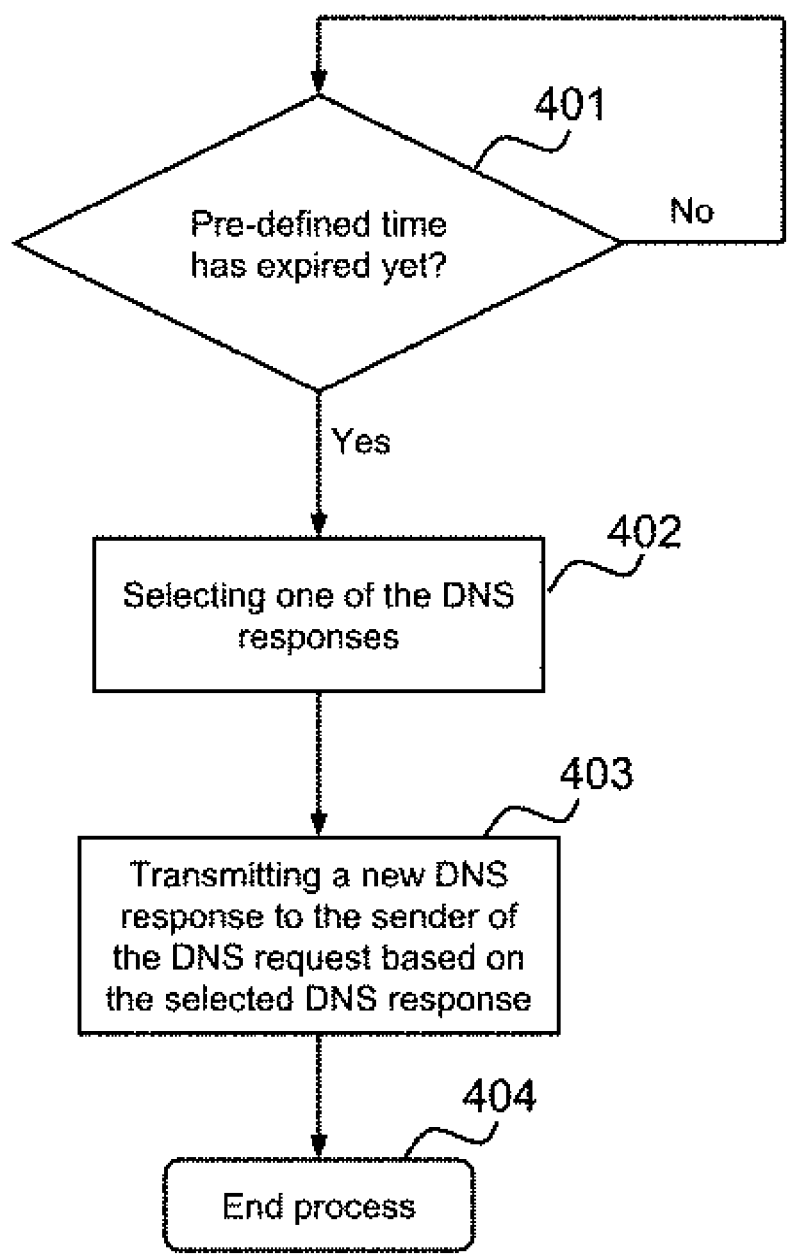
FIG. 4 is a flowchart illustrating a process in accordance with one of the embodiments of the present invention.

FIG. 4 is a flow chart illustrating one of the embodiments of the present invention. To illustrate the embodiment, FIG. 1A is used in conjunction with FIG. 4. If a predefined time has not expired at gateway 101, gateway 101 waits until the pre-defined time expires while storing DNS responses corresponding to the new DNS request, which was received via LAN interface 102 in the memory at step 401.

At step 402, gateway 101 selects one of the DNS responses. There are many ways in which gateway 101 performs selection of the DNS responses, including ways based on the time of arrival, the contents of the DNS responses, the identity of the DNS servers, the source of the DNS responses, etc. According to one of the embodiments of the present invention, the selection of DNS responses is according to a pre-defined policy. In one example, the selection policy is to select a DNS response from DNS server 131 if the DNS response is available before the pre-defined time has expired. In one example, if no DNS response is available before the pre-defined time. In one example, the policy is to select a DNS response which arrives at the DNS server 131 the earliest. In one example, the settings of the selection policy can be configured by the administrator of gateway 101 remotely or locally.

At step 403, gateway 101 transmits a new DNS response to the sender of the first DNS request based on the selected DNS response.

Figure 5:
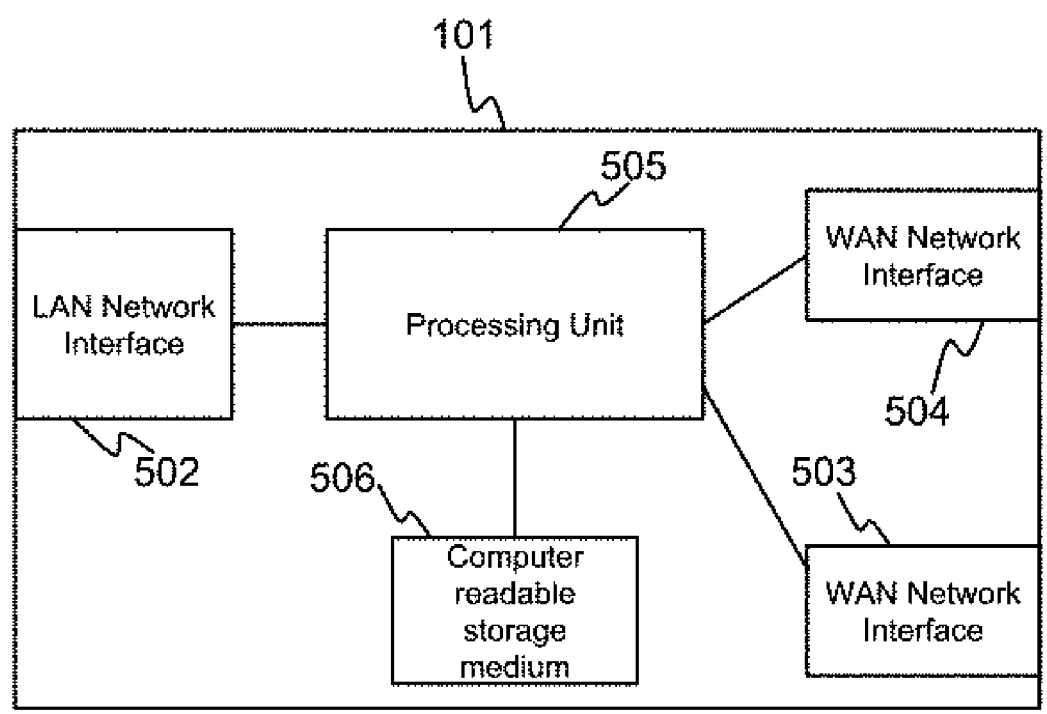
FIG. 5 is a block diagram of a gateway in accordance with various embodiments of the present invention.

FIG. 5 illustrates one of the embodiments of present invention of a gateway with the capability to process DNS request according to the present invention described. Gateway 101 comprises a processing unit(s) 505, a computer readable storage medium 506, at least one LAN interface 502, and a plurality of WAN interfaces, such as a first WAN interface 503 and a second WAN interface 504, for use with other network apparatus such as Ethernet switches, IP routers and other packet network devices, network management and provisioning systems, local PCs, etc. Other components which may be utilized within gateway 101 include amplifiers, board level electronic components, as well as media processors and other specialized SoC or ASIC devices. Support for various processing layers and protocols (e.g., 802.3, DOCSIS MAC, DHCP, SNMP, H.323/RTP/RTCP, VoIP, SIP, etc.) may also be provided as required.

Gateway 101 may take any number of physical forms, comprising, for example one of a plurality of discrete modules or cards within a larger network edge or hub device of the type well known in the art and may also comprise firmware, either alone or in combination with other hardware/software components. Alternatively, gateway 101 may be a stand-alone device or module disposed at other computing device or network device and may even include its own Radio Frequency (RF) front end (e.g., modulators, encryptors, etc.) or optical interface so as to interface directly with other computing devices and network devices. Numerous other configurations may be used. Gateway 101 may also be integrated with other types of components (such as mobile base stations, satellite transceivers, video set-top box, encoders/decoders, etc.) and form factors if desired.

Processing unit(s) 505 may be implemented by using one or more central processing units, network processors, microprocessors, micro-controllers, FPGAs, ASICs or any device capable of performing instructions to perform the basic arithmetical, logical, and input/output operations of the system.

Computer readable storage medium 506 may be implemented by using at least one DRAM, SDRAM, Flash RAM, optical memory, magnetic memory, hard disk, and/or any computer readable media that are able to provide storage capability. Computer readable storage medium 506 may be used to provide instructions to processing unit 505, to provide storage to store identifiers, conditions, network performance statistics and other data to facilitate the operation of the gateway.

When processing unit(s) 505 performs selection according to a pre-defined policy, processing unit(s) 505 retrieves information corresponding to the pre-defined policy from computer readable storage medium 506, and then performs necessary logical operation and arithmetical calculation in order to perform the selection.

A plurality of WAN interfaces at gateway 101, such as WAN interfaces 503 and 504, may be implemented using serial bus, universal serial bus (USB), parallel bus, a universal asynchronous receiver/transmitter (UART), Peripheral Component Interconnect (PCI), local bus, or other electronic components connecting technology to connect processing unit(s) 505 and an agent, which is used to be connected with optical fiber, cable, or antenna. In one variant, at least one of the plurality of WAN interfaces is in the processing unit(s) 505 and therefore the agent for connecting with optical fiber, cables or antenna may directly connect with the processing unit 505. In one variant, at least one WAN interface may connect to an Ethernet port for Ethernet WAN connection. In one variant, at least one of the plurality of WAN interfaces may connect to a Wi-Fi adapter for Wi-Fi network connection. In one variant, at least one of the plurality of WAN interfaces may connect to a USB port and the USB port may connect to an external modem for wireless WAN connection, such as a USB 3G modem, USB LTE modem, USB WiMax Modem, USB Wi-Fi Modem, or other modem for wireless communications. In one variant, all of the plurality of WAN interfaces connect a plurality of USB ports for external modem connections. In one variant, all of the plurality of WAN interfaces connect to circuitry inside gateway 101. Myriad other combinations and permutations of the foregoing will be appreciated by those of ordinary skill given the present disclosure.

When gateway 101 receives a first DNS request via LAN interface 502, which is described as first DNS request in FIG. 1, processing unit(s) 505 selects at least one DNS server and selects at least one access network, which is connected to WAN interface 503 or 504. The DNS servers available for selection may be configured by the administrator of gateway 101 manually, provided by the service provider of an access network, retrieved from Computer readable storage medium 506, or obtained from at least one DHCP message. According to one of the embodiments of the present invention, when processing unit(s) 505 selects a DNS server, processing unit 505 also selects an access network that is authorized to send a new DNS request to that selected DNS server, because some DNS servers only respond to DNS requests originated from authorized IP addresses.

According to one of the embodiments of the present invention, the first DNS request is received from a sender through LAN interface 502.

Processing unit(s) 505 may select DNS server and select access network randomly, according to a pre-defined process, according to statistical values or etc. It would be apparent to those skilled in the art that many more methods and techniques may be used for the selection.

As described above, there are altogether n times m available combinations of DNS server and access network. Processing unit(s) 505 selects at least two of such combinations of DNS server and access network for transmitting a plurality of new DNS requests. Therefore, when processing unit 505 only selects one DNS server, processing unit 505 selects at least two access networks; when processing unit 505 only selects one access network, processing unit 505 selects at least two DNS servers. The new DNS requests correspond to the first DNS request, such that the queries of the new DNS requests are the same as the query of the first DNS request. It would be apparent to those skilled in the art that many more methods and techniques may be used to create the new DNS requests according to the query of the first DNS request.

The new DNS requests are transmitted to the selected DNS servers through the selected access networks connected to WAN interface 503 and/or 504.

After the new DNS requests are transmitted, processing unit(s) 505 may receive DNS responses from one of the plurality of WAN interfaces to respond to the new DNS requests from the selected DNS servers. Processing unit(s) 505 transmits one, more than one or all the received DNS responses to the host. The new DNS response contains the same response from the received DNS response. The sender of the first DNS request is a host, which sends of the first DNS request to gateway 101 via LAN interface 502.

According to one of the embodiments of the present invention, processing unit 505 transmits all the received DNS responses to the host.

When gateway 101 receives DNS responses, processing unit 505 transmits a new DNS response to the host only when the received DNS response is valid and no other new DNS response has been transmitted to the host. Therefore, the host only receives a DNS response for the first DNS request it sent earlier. If other DNS responses with a RCODE of zero have been received by gateway 101, processing unit 505 discards these received DNS responses.

According to one of the embodiments of the present invention, when no new DNS response has been transmitted to the host after a pre-defined timeout, processing unit 505 transmits a new DNS response with a non-zero RCODE. The value of the predefined timeout is stored at computer readable storage medium 506. In one variant, processing unit 505 sets the value of the RCODE in the new DNS response to be the same as the RCODE of one of the received DNS responses. When gateway 101 has received more than one DNS responses and none of these Received DNS responses are valid before the pre-defined timeout, processing unit 505 may determine how to respond to the first DNS request. The DNS responses received may be stored at computer readable storage medium 506. According to one of the embodiments of the present invention, processing unit 505 transmits a new DNS response to the host with a RCODE retrieved from one of the received DNS responses. In one variant, the RCODE in the first DNS request is the majority RCODE contained in all received DNS responses. In one variant, for example, the RCODE in the first DNS request is chosen randomly from one of the received DNS responses.

In one example, the pre-defined policy is to select a DNS response among all received DNS responses according to the arrival time of the received DNS responses within a time threshold. When a DNS response is received by gateway 101 via one of the network interfaces 503 or 504, processing unit(s) 505 stores the arrival times of the received DNS responses in computer readable storage medium 506 first. When the time threshold is reached, processing unit(s) 505 retrieves all the arrival times from computer readable storage medium 506 to select the DNS response that arrived the earliest with a valid code.

When DNS requests are sent to one or more DNS servers through a secured tunnel, the DNS responses received from the one or more DNS servers through the secured tunnel are less likely to be tampered compared to DNS responses not received through the secured tunnel. Therefore, it is beneficial to use a secured tunnel for sending requests and receiving responses to and from a DNS server respectively. The secured tunnel may be established by tunneling protocols such as Layer 2 Tunneling Protocol (L2TP), Point-to-Point Protocol (PPP), Point-to-Point Tunneling Protocol (PPTP), Virtual Private networks (VPNs), Internet Protocol Security (IPSec), Generic Routing Encapsulation (GRE), Multicast Backbone (MBone), Secure Sockets Layer (SSL), Secure Shell (SSH) and Transport Layer Security (TLS). The present invention discloses gateway 101 establishing tunnels with remote router(s). In a preferred embodiment, the tunnels are VPN connections. For easy reading, the embodiments described herein comprise the term "±VPN connection". It should be noted that the scope of the invention is not limited to VPN connections as tunnels. A tunnel, secured or not, allows encapsulation to be performed. Through a tunnel, DNS requests and DNS responses can be encapsulated in one or more Internet Protocol packets. When a VPN gateway encrypts IP packets that are transmitted through a tunnel, the tunnel can be considered as a secured tunnel.

FIG. 6 is a block diagram representing the network environment according to one of the embodiments of the present invention.

Gateway 101 is capable of establishing a tunnel, such as a virtual private network (VPN) connection with router 600 through one or both of WAN interfaces 103 and 104. For example, gateway 101 can establish a first tunnel, herein referred to as first VPN connection, with router 600 using WAN interface 103 via access network 121 and interconnected networks 105. Gateway 101 can further establish a second tunnel, herein referred to as second VPN connection, with router 600 using WAN interface 104 via access network 122 and interconnected networks 105.

The first VPN connection and the second VPN connection can be combined, bonded or aggregated to form an aggregated VPN connection with router 600. Using an aggregated VPN connection may result in higher bandwidth which is a combined bandwidth of the individual VPN connections. The aggregated VPN connection may be perceived as one VPN connection by sessions or applications that are using it.

Gateway 101 is capable of accessing DNS server 602 through the first or second VPN connection that is established between gateway 101 and router 600. Alternatively, if the first and second VPN connections are bonded or aggregated to form an aggregated VPN connection, gateway 101 is capable of accessing DNS server 602 through the aggregated VPN connection. Router 600 is connected to DNS server 602 through access network 603.

DNS server 602 can be accessed only through router 600. In one example, access network 603 is provided by an Internet Service Providers (ISPs). For example, access network 603 connected to router 600 may be provided by Verizon using DSL technology. In order to send a request to DNS server 602, the DNS request has to pass through router 600.

DNS server 601 can be accessed by gateway 101 through interconnected networks 105. In one variant, gateway 101 sends a DNS request to and receives a DNS reply from DNS server 601 through the first or second VPN connection. For illustration purposes, WAN interface 103 connects to router 600 through the first VPN connection, and router 600 can access DNS server 601 through interconnected networks 105. Therefore gateway 101 is capable of accessing DNS server 601 through router 600 using the first VPN connection or directly without using router 600.

Those skilled in the arts would appreciate that DNS servers in different geographical locations may resolve DNS request differently. This could be due to many reasons. For example, in some regions, due to regulatory or legal reasons, DNS servers fail to resolve a DNS request comprising specific domain name purposely or not purposely or resolve the DNS request inaccurately. For example, a DNS server located in Country A may not provide an accurate IP address for websites that are restricted in Country A. Therefore, it might be beneficial send a DNS request to a trusted DNS server, such as a DNS server located outside Country A, through a VPN, so that the DNS response received from the DNS server is accurate and not tampered.

A downside of this approach may be that it may not take advantage of Content Distribution Network(s). Gateway 101 may try accessing a DNS server located outside Country A through a VPN connection instead of accessing a DNS server provided by a content distribution network that is in close proximity of gateway 101. Therefore, it takes a longer time to send a DNS request and to receive a DNS response to and from the DNS server which is located outside Country A respectively.

Figure 6B:
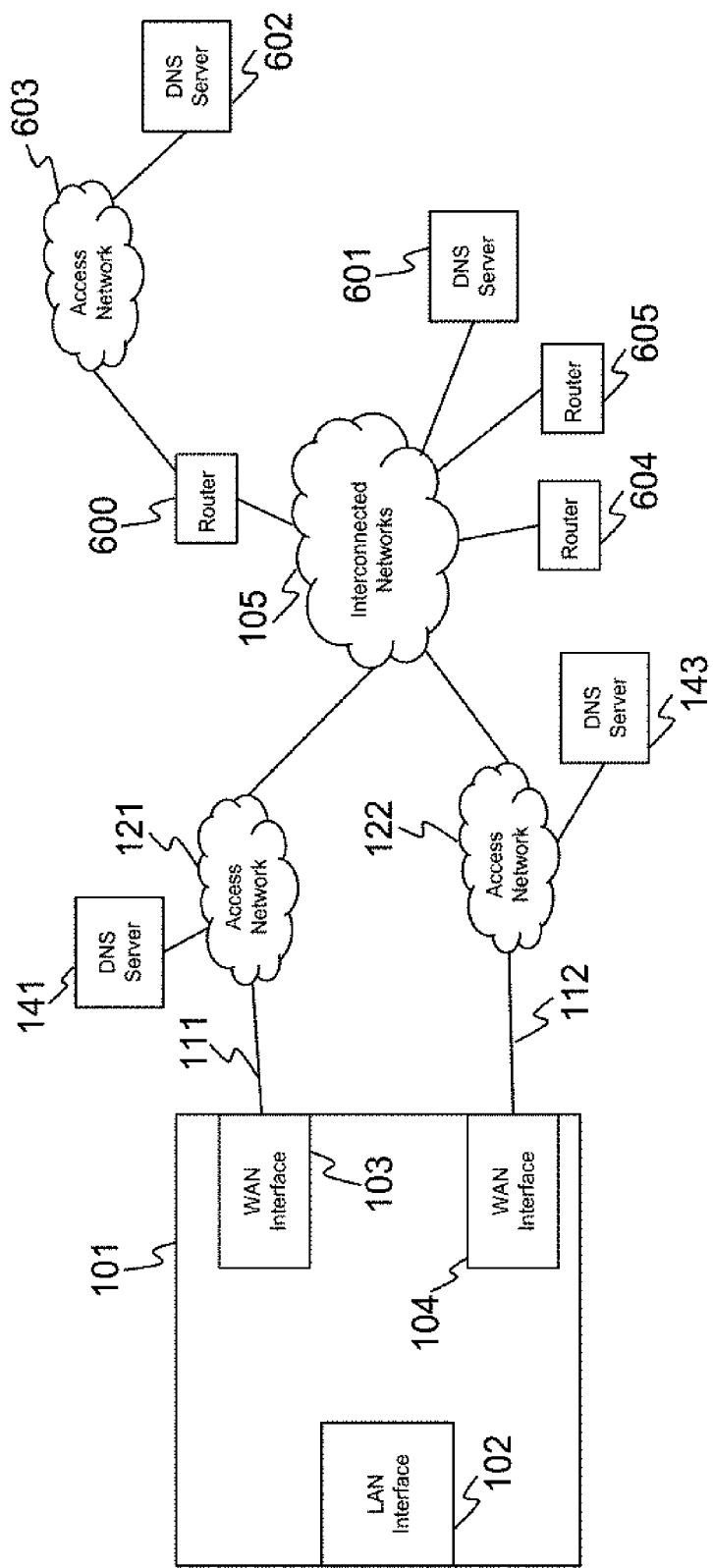
FIG. 6B is a block diagram representing the network environment according to one of the embodiments of the present invention.
Figure 7:
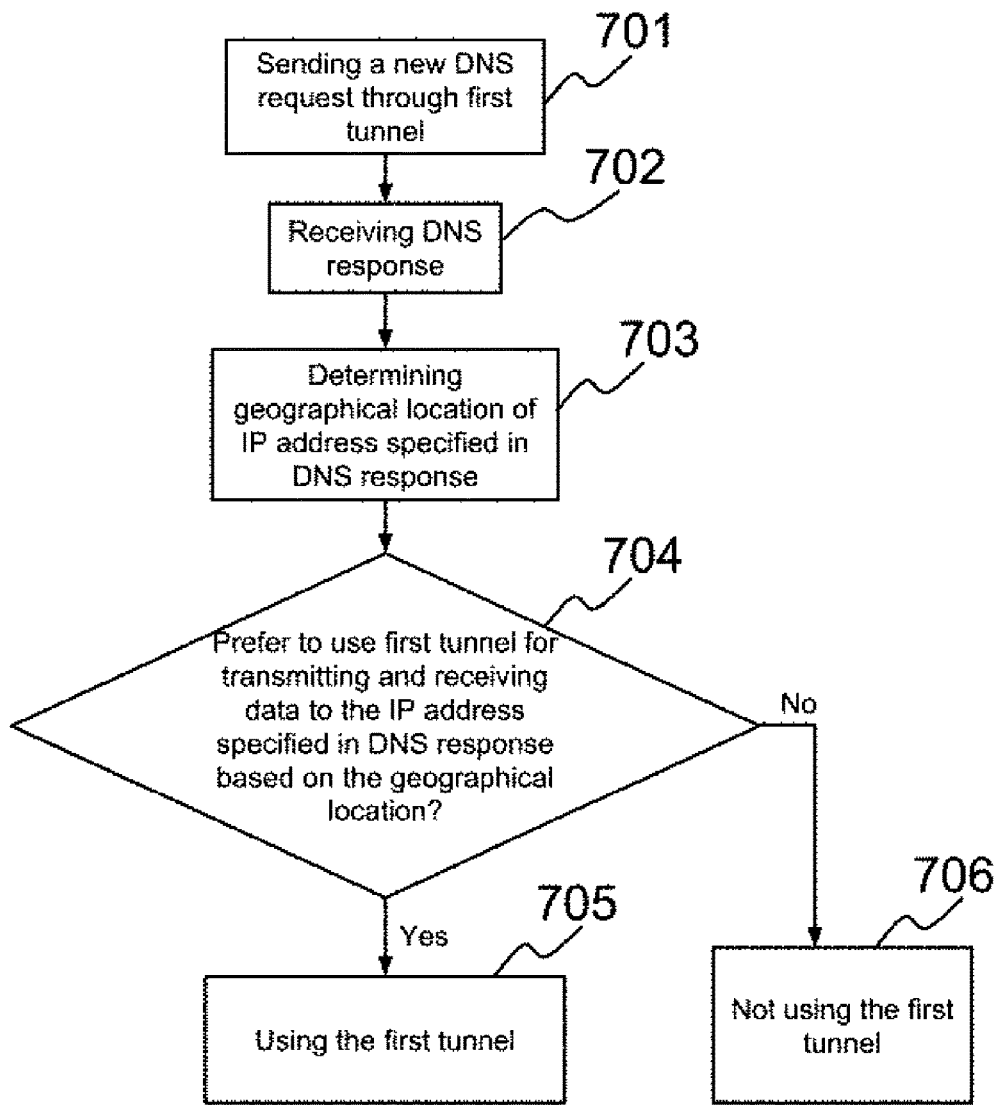
FIG. 7 is a flowchart illustrating a process according to one of the embodiments of the present invention.

FIG. 7 is a flowchart illustrating a process according to one of the embodiments of the present invention. FIG. 7 is viewed in conjunction with FIG. 6 for better understanding of the embodiments. When gateway 101 receives a DNS request from a host to resolve a domain name through LAN interface 102, it transmits a new DNS request to a DNS server, such as DNS server 602 through the first VPN connection in step 701. The new DNS request has the same contents as contained in the DNS request. In step 702, gateway 101 receives a valid DNS response from DNS server 602 through the first VPN connection. Gateway 101 then determines an approximate geographical location corresponding to an IP address specified in the DNS response in step 703. Based on the geographical location determined in step 703, gateway 101 determines in step 704 whether or not it should transmit and/or receive data to and/or from the IP address using the first VPN connection. Gateway 101 transmits and/or receives data to and from the IP address through the first VPN connection in step 705 if it determines to do so in step 704. Gateway 101 transmits and/or receives data to and from the IP address without using the first VPN connection in step 706 if it determines to do so in step 704.

In one variant, for example, gateway 101 stores the decision made in step 705 corresponding to the IP address in computer readable storage medium 506. Therefore, for every data packet, gateway 101 may determine its destination IP address and decide whether the data packet should be transmitted through the first VPN connection or not. For illustration purpose, Gateway 101 may decide whether data packet should be transmitted through the first VPN connection or not by looking up the decision from a lookup table.

In one variant, when it is determined to use the first VPN connection at step 705, gateway 101 may store the domain name specified in the DNS request. When there are further data destined to the domain name from the host or other hosts connected to the LAN interface 102 through gateway 101, gateway 101 transfers the data through the first VPN connection as the decision made in step 704 also applies to data transferred between other hosts. In one variant, an outbound policy can be formed by processing unit(s) 505 to instruct VPN gateway 101 to transfer data for the host and/or other hosts to the domain name through the first VPN connection. Alternatively, instead of using the domain name, the IP address specified in the DNS response can be stored and/or be used to form the outbound policy. Therefore, data transferred between a host having the IP address and the host and/or other hosts may go through the first VPN connection. This may reduce the need to perform DNS request frequently for the same domain name in the future and reduce the need to establish outbound policy. In one variant, there is a time limit for the storing of the domain name and/or the outbound policy as a DNS response may become outdated. The time limit may be set according to the time-to-live (TTL) value of the DNS response.

Those who are skilled in the arts would appreciate that DNS requests and DNS responses can be intercepted and there are many reasons for such interception, such as to improve responsiveness by load balancing DNS request and by using DNS proxy. Those who are skilled in the arts would appreciate that DNS requests and DNS responses are subjected to hacking, eavesdropping and interception by bad-faith middle man. As a result, by sending DNS requests and receiving DNS responses through a VPN connection allows more secured transmission and receive of DNS requests and DNS responses.

In one variant, gateway 101 transmits the new DNS request to a DNS server, such as DNS server 601 without using the first VPN connection. Therefore, the new DNS request is sent to DNS server 601 directly without being sent to router 600. In this case, the DNS response received from DNS server 601 will also not be received through the first VPN connection. Hence, there is a possibility that the DNS response is tampered since it is not sent securely through a VPN connection.

In one variant, gateway 101 determines geographical location of the IP address based on information retrieved from an IP geolocation database. The IP geolocation database may be compiled from websites that ask users for their geographical location. Typically, utilization of such IP geolocation databases may have a very high accuracy in determining the country of an IP address. For illustration purposes, Maxmind's GeoLite databases are used as the IP geolocation database. The database may be imported and stored in a storage medium of gateway 101, such as computer readable storage medium 506. Gateway 101 then has to maintain the stored database accordingly.

Alternatively, the geographical location of an IP address may be determined by sending a query to a third party for resolving the geographical location of the IP address. The third party, such as Google's BigQuery, may have higher processing power, and thus using the third party to resolve the geographical location of the IP address may be faster. This is because maintaining whole IP geolocation database and resolving the geographical location of the IP address using the processing power of just gateway 101 may be very time consuming. However, there may be downsides of using a third party to resolve the geographical location of the IP address, such as lack of privacy. It may not be safe to allow a third party to hold sensitive information such as which IP addresses are being sent in the queries for resolving their geographical locations. Furthermore, the speed of receiving the response containing the geographical location information of the IP address may be lower compared to when gateway 101 resolves the geographical location of the IP address. This is because the database maintained by the third party is remote and hence communication speed may be low.

In another variant, router 600 determines the geographical location of the IP address specified in the DNS response using an IP geolocation database and sends the geographical location information of the IP address to gateway 101 through the first VPN connection. The geographical location information of the IP address is sent to gateway 101 in a separate message which is not part of the DNS response that router 600 forwards to gateway 101. The DNS response and the message with the geographical location information may be sent substantially at the same time or one after another in any order.

The determination of whether or not to use the first VPN connection for transmitting and/or receiving data to and/or from the IP address based on the geographical location may be performed according to one or more policies. For example, gateway 101 is located in Country A, the IP address is located in New York, and router 600 is also located in New York or any geographical location other than Country A. Gateway 101 may be configured to use a VPN connection for transmitting and/or receiving data to and/or from IP addresses not located in the same region as gateway 101, i.e. Country A. Since the IP address is not located in Country A, gateway 101 determines to use the first VPN connection in step 704 and transmits and/or receives data to and/or from the IP address through the first VPN connection in step 705. In another example, gateway 101 is located in Country A, the IP address is located in Country A, and router 600 is located in New York. In this case, gateway 101 does not use the first VPN connection to transmit and/or receive data to and/or from the IP address in step 706. It is more convenient to communicate with the IP address directly rather than connecting to the IP address through router 600 located in New York, since gateway 101 is in the same region as the IP address and data may be sent and received faster.

When an IP address is located outside Country A, it may be beneficial to use a VPN connection to transmit and/or receive data to and/or from the IP address as the communication is more secure and is not affected by regulatory or legal barriers implemented through firewalls. The communication is more secure because it is likely that middlemen in the communication route cannot see the data in the packets, as they are encrypted to be sent through the VPN connection, and only the endpoints of the VPN connection may have the resources such as the decryption and encryption key for seeing the data. Alternatively, when an IP address is located inside Country A, it is less likely to have regulatory or legal barriers for accessing the IP address, and hence using a VPN connection with router 600 is not required. In addition, the response should be faster as it does not need to go through VPN first and then go back to Country A.

In another example, a first host is connected to gateway 101 through LAN interface 102. Gateway 101 is configured such that when gateway 101 receives data destined to a first IP address or a domain name from the first host, gateway 101 transmits the data through the first VPN connection if the first IP address is located in a particular geographical location in step 705. Therefore, gateway 101 receives data from the first IP address or the domain name destined to the first host through the first VPN connection. This may be beneficial if the user or administrator requires the communication between the host and any IP address in that particular geographical location to be secured and private. If the first IP address is not in the particular geographical location, gateway 101 does not use the first VPN connection to transmit and/or receive data to and/or from the IP address in step 706.

Figure 8:
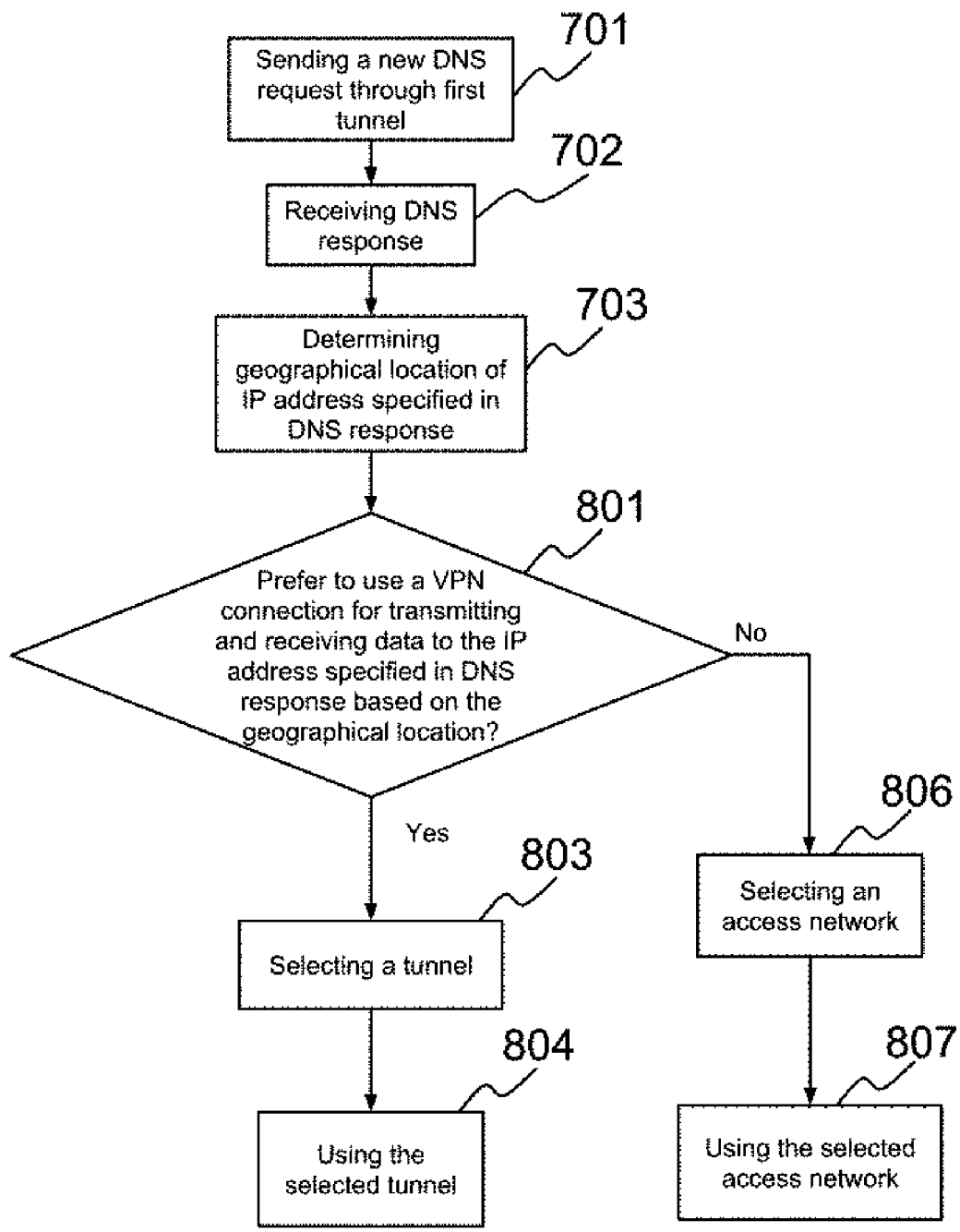
FIG. 8 is a flowchart illustrating a process according to one of the embodiments of the present invention.

FIG. 8 is a flowchart illustrating a process according to one of the embodiments of the present invention. FIG. 8 is viewed in conjunction with FIG. 6 and FIG. 7 for better understanding of the embodiments.

For illustration purpose, gateway 101 establishes multiple tunnels, herein referred to as VPN connections. Referring to FIG. 6B, a first and second VPN connection is established with router 600 using WAN interfaces 103 and 104 respectively. A third VPN connection is established with router 604 using WAN interface 103 and a fourth VPN connection is established with router 605 using WAN interface 104. The first and second VPN connections may be bonded to form an aggregated VPN connection.

When, in step 701, gateway 101 sends a new DNS request through the first VPN connection to DNS server 602, it determines in step 703 the geographical location corresponding to an IP address specified in the DNS response received in step 702. Based on the geographical location, gateway 101 determines whether a VPN connection should be used for communicating with the IP address in step 801. Since gateway 101 has established multiple VPN connections, gateway 101 selects one of the VPN connections in step 803 if it determines to use a VPN connection in step 801. Gateway 101 then uses the selected VPN connection for communicating with the IP address in step 804.

If gateway 101 determines not to use a VPN connection for communicating with the IP address, gateway 101 selects an access network or WAN interface for communicating with the IP address in step 806. Gateway 101 then uses the selected access network for communicating with the IP address.

One of the multiple VPN connections may be selected in step 803 according to one or more policies. In one variant, priorities are assigned to the multiple VPN connections. For example, the first and second VPN connections are assigned with the highest priority, the third VPN connection is assigned with the second-highest priority, and the fourth VPN connection is assigned with the lowest priority. Therefore, gateway 101 uses one or both of the first and second VPN connections for transmitting and/or receiving data to and/or from the IP address. If the first and second VPN connections are bonded, the aggregated VPN connection may be used for transmitting and/or receiving data to and/or from the IP address.

In another variant, gateway 101 selects a VPN connection which has the least usage price. The usage price of the VPN connection may vary according to the usage price of the access network, such as access networks 121 and 122, used to establish the VPN connection. The usage price may be entered by the administrator or retrieved from a database.

In another variant, gateway 101 selects a VPN connection based on bandwidth availability. For example, gateway 101 selects the third VPN connection for transmitting and/or receiving data to and/or from the IP address if the third VPN connection has the highest available bandwidth. One of the benefits is to reduce traffic congestion.

In another variant, gateway 101 selects a VPN connection based on the geographical location of the termination point of the VPN connection. The termination point of the first and second VPN connections is router 600, and the termination points of the third and fourth VPN connections are routers 604 and 605 respectively. For example, routers 600, 604 and 605 are located in New York, Hong Kong and London respectively. The geographical location of the IP address is determined to be in Hong Kong in step 703. Gateway 101 then selects the third VPN connection for transmitting and/or receiving data to the IP address.

When gateway 101 determines not to use a VPN connection in step 801, gateway 101 selects an access network in step 806 for transmitting and/or receiving data to and from the IP address. An access network may be selected randomly or according to one or more policies in step 806. In one variant, the policy is to select an access network based on configuration entered by the gateway administrator. In one example, the policy is to select an access network based on bandwidth availability. In one example, the policy is to select an access network based on statistical analysis or historical data network performance achieved while using the access network. In one example, the policy is to select an access network based on the usage price of the access network.

Priorities may be assigned to the access networks or WAN interfaces. For example, access network 121 has a higher priority than access network 122. Therefore gateway 101 transmits and/or receives data to and/or from the IP address through access network 121 using WAN interface 103 in step 807. In another example, WAN interface 104 has a higher priority than WAN interface 103. Therefore gateway 101 transmits and/or receives data to and/or from the IP address through access network 122 using WAN interface 104 in step 807.

It should be noted that in some cases, assigning priorities to WAN interfaces may be different from assigning priorities to access networks, as the access network that a WAN interface connects to may vary. For example, access network 121 has a higher priority than access network 122. The user or administrator of gateway 101 changes the connections such that access network 121 connects to WAN interface 104 and access network 122 connects to WAN interface 103. In this case, gateway 101 transmits and/or receives data to and/or from the IP address through access network 121 using WAN interface 104 in step 807. If priorities were assigned to WAN interfaces such that WAN interface 103 has a higher priority than WAN interface 104, gateway 101 would transmit and/or receive data to and/or from the IP address through access network 122 using WAN interface 103 in step 807. Priorities may be assigned to access networks based on usage price, network performance, time, etc. Priorities may be assigned to WAN interfaces according to signal-to-interface ratio, signal-to-noise ratio, and other properties observed at the WAN interfaces.

Figure 9:
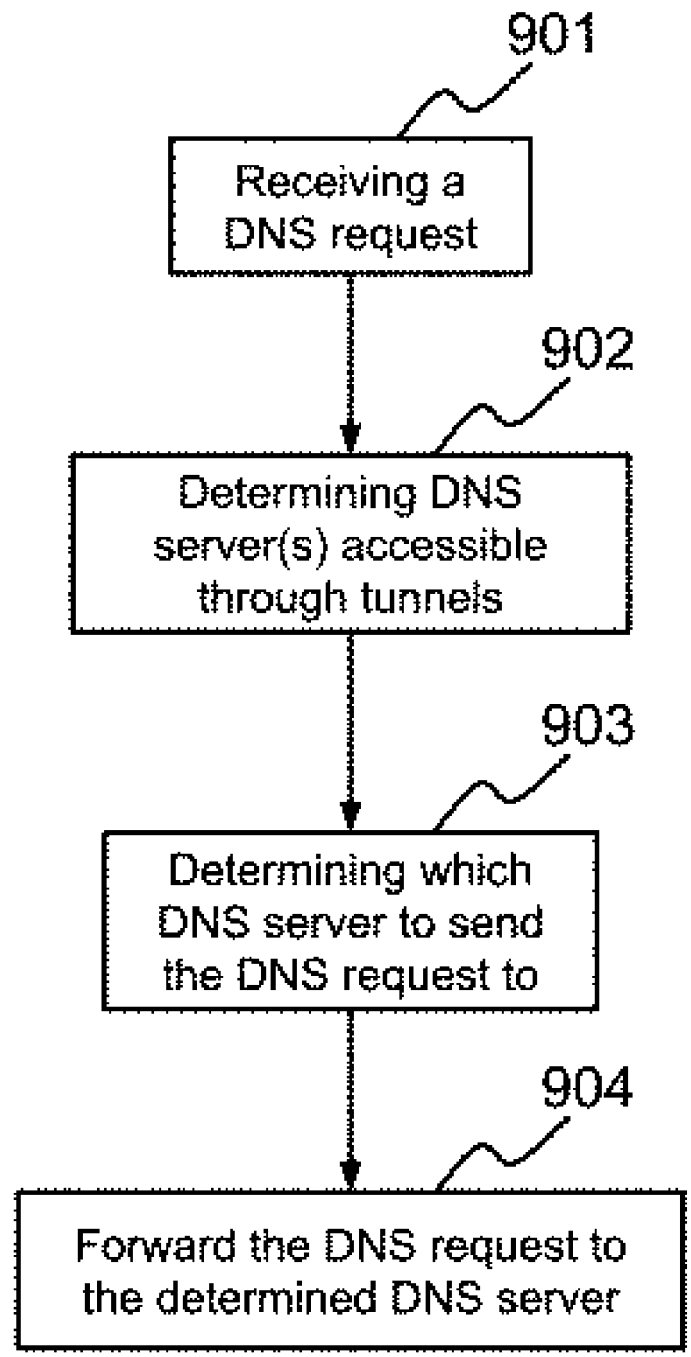
FIG. 9 is a flowchart illustrating a process of sending a DNS request to one or more DNS servers according to one of the embodiments.

FIG. 9 is a flowchart illustrating a process of sending a DNS request to one or more DNS servers according to one of the embodiments.

Gateway 101 first receives a DNS request from a host through LAN interface 102 in step 901. In step 902, gateway 101 determines a list of DNS servers that can be reached through one or more VPN connections established by gateway 101. Gateway 101 then selects one or more DNS servers from the list of DNS servers in step 903 for sending the DNS request to. In step 904, gateway 101 sends new DNS requests to the selected DNS servers. The new DNS requests are substantially based on the DNS request received from the host through LAN interface 102.

The list of DNS servers that can be reached through a VPN connection may comprise one or more DNS servers. For example, gateway 101 establishes a first and second VPN connection with router 600 through WAN interfaces 103 and 104 respectively. DNS server 602 and 601 can be reached through the one or both of the first and second VPN connection. On the other hand, DNS servers 141 and 143 cannot be reached through a VPN connection. Therefore, in step 902, the list of DNS servers include DNS servers 602 and 601.

Gateway 101 may then select one or both of DNS servers 602 and 601 to send the new DNS request to. The selection may be according to a policy based on reply speed, historical statistics, or priority. For example, if the reply speed of DNS server 601 is significantly lower than that of DNS server 602, gateway 101 selects DNS server 602 in step 903.

In another example, DNS server 602 may have a higher priority assigned by a user or administrator of gateway 101. For illustration purpose, access network 603 is an office network and DNS server 602 is an internal DNS server. A higher priority may be assigned to DNS server 602 since it is an internal DNS server, and router 600 need not access it through interconnected networks 105. Therefore, DNS responses received from DNS server 602 may be less likely to be tampered. Since router 600 accesses DNS server 601 through interconnected networks 105, which is a public network, the DNS response received from DNS server 601 is more likely to be tampered. Also, DNS server 602 may be able to resolve DNS requests corresponding to certain internal domain names that may not be resolved by DNS server 601 accurately. Therefore, when DNS server 602 has higher priority, gateway 101 selects DNS server 602 in step 903 for sending new DNS request to.

Figure 10:
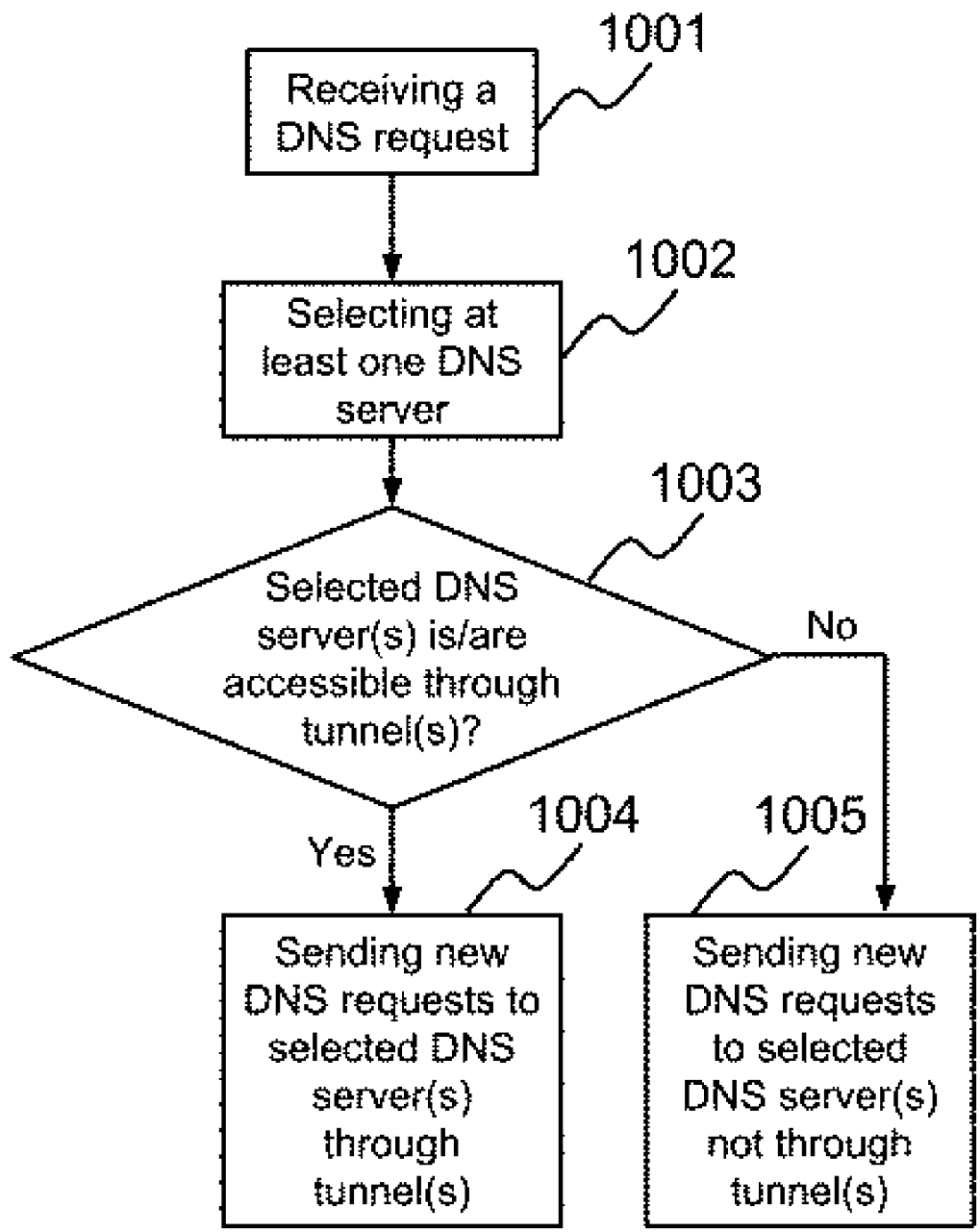
FIG. 10 is a flowchart illustrating a process for sending DNS requests to one or more DNS servers according to one of the embodiments of the present invention.

FIG. 10 is a flowchart illustrating a process for sending DNS requests to one or more DNS servers according to one of the embodiments of the present invention. Gateway 101 receives a DNS request from a host through LAN interface 102 in step 1001. In step 1002, gateway 101 selects at least one DNS server for sending the new DNS request to. The selection may be based on a policy based on reply speed, historical statistics, geographical location or priority. If gateway 101 determines in step 1003 that the selected DNS server(s) may be accessed through one or more VPN connections, then the new DNS requests are sent to the selected DNS server(s) through the one or more VPN connections in step 1004. Alternatively, if the selected DNS server(s) cannot be accessed through any VPN connections, gateway 101 sends the new DNS request to the selected DNS server(s) without using a VPN connection in step 1005.

For example, the first VPN connection is established between WAN interface 103 of gateway 101 and router 600, which may be used to access DNS servers 601 and 602. For illustration purposes, the selected DNS servers in step 1002 include DNS servers 143 and DNS server 601. Gateway 101 determines in step 1003 that DNS server 143 cannot be accessed through a VPN connection with router 600. Therefore, gateway 101 sends a new DNS request to DNS server 143 without using a VPN connection in step 1005. In step 1003, gateway 101 also determined that DNS server 601 may be accessed through the first VPN connection and also without using a VPN connection. Therefore, gateway 101 sends a new DNS request to DNS server 601 through the first VPN connection.

Although DNS server 601 may be accessed directly through interconnected networks 105 without using the first VPN connection, it is preferred that gateway 101 sends the new DNS request to DNS server 601 through the first VPN connection. When the new DNS request is sent through the first VPN connection, the corresponding DNS response is received from DNS server 601 through the first VPN connection also, and hence the DNS response is less likely to be tampered.

Figure 11:
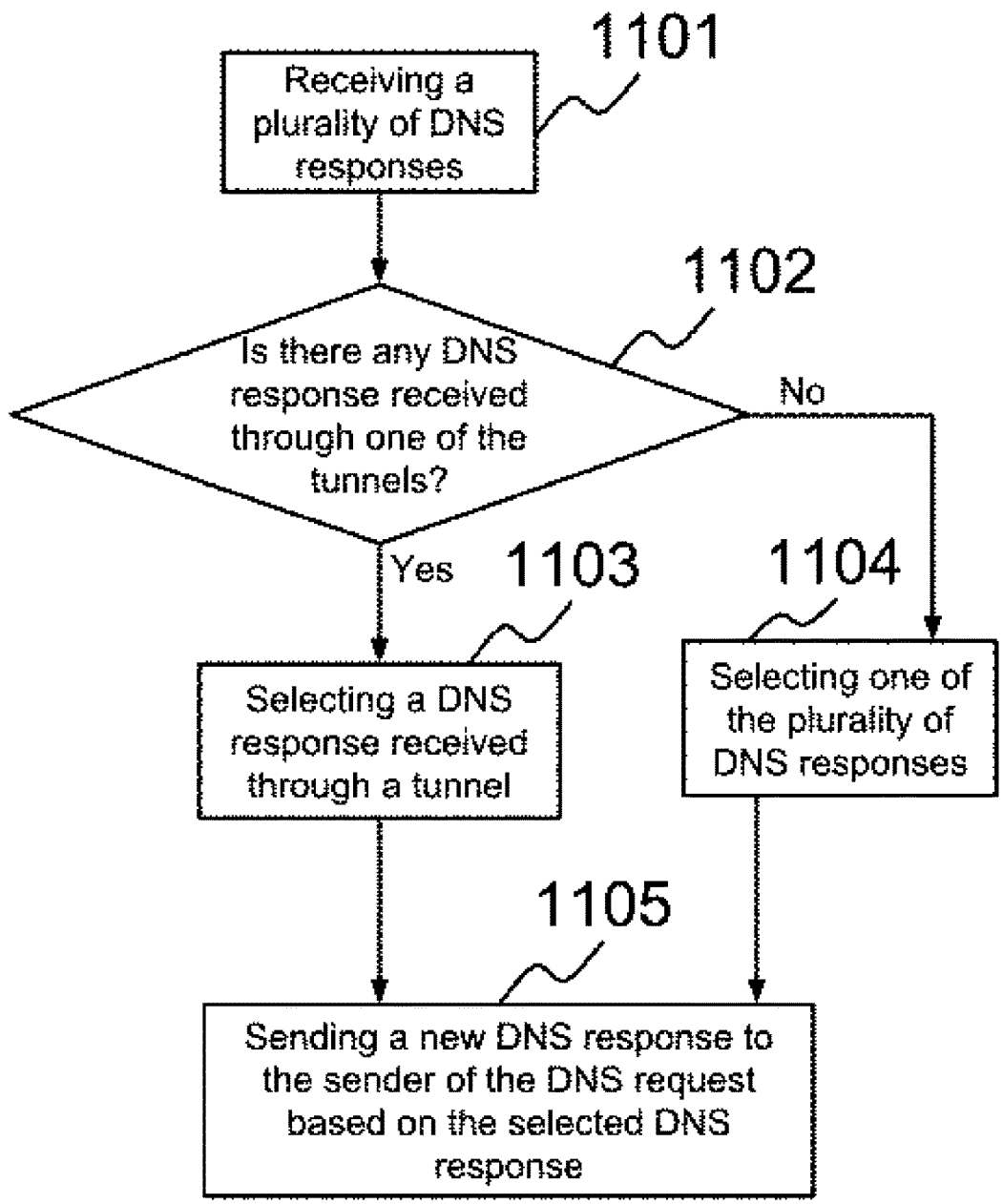
FIG. 11 is a flowchart illustrating a process for selecting a DNS response according to one of the embodiments.

FIG. 11 is a flowchart illustrating a process for selecting a DNS response according to one of the embodiments. Gateway 101 receives a plurality of DNS responses in step 1101. The plurality of DNS responses are responses to new DNS requests sent by gateway 101, where the new DNS requests are based on a DNS request received by gateway 101 from a host through LAN interface 102. In step 1102, gateway 101 determines whether any of the plurality of DNS responses were received through a VPN connection. If any DNS responses were received through a VPN connection, gateway 101 selects one of the DNS responses received through a VPN connection in step 1103. If no DNS responses were received through a VPN connection, gateway 101 selects one of the DNS responses from the plurality of DNS responses in step 1104. Gateway 101 then sends a new DNS response to the host in step 1105 based on the selected DNS response. Therefore, in step 1102, priority is given to a DNS response received through a VPN connection over a DNS response not received through a VPN connection.

For example, a first DNS response is received from DNS server 602 through the first VPN connection, a second DNS response is received from DNS server 601 through the first VPN connection, a third DNS response is received from DNS server 141 through access network 121 and a fourth DNS response is received from DNS server 143 through access network 122. Gateway 101 determines in step 1102 that the first and second DNS responses are received through the first VPN connection, and therefore selects one of the first and second DNS responses in step 1103. The selection may be performed randomly or may be according to a policy based on time and order of receiving the DNS responses, order of receiving, historical statistics and reply speed of the DNS servers, geographical location of DNS servers, or priorities of the DNS servers. For illustration purpose, the first DNS response is selected because it was received earlier than the second DNS response.

In another example, a first DNS response is received from DNS server 601 through interconnected networks 105 without using the first VPN connection, a second DNS response is received from DNS server 141 through access network 121 and a third DNS response is received from DNS server 143 through access network 122. Gateway 101 determines in step 1102 that no DNS response was received through a VPN connection, and therefore selects one of the first, second and third DNS responses in step 1104. The selection may be performed randomly or may be according to a policy based on time and order of receiving the DNS responses, order of receiving, historical statistics and reply speed of the DNS servers, or priorities of the DNS servers. For illustration purpose, the second DNS response is selected because historical statistics indicate that responses from DNS server 141 are most likely to be accurate when compared to DNS responses received from DNS server 143 or 601.

Figure 12:
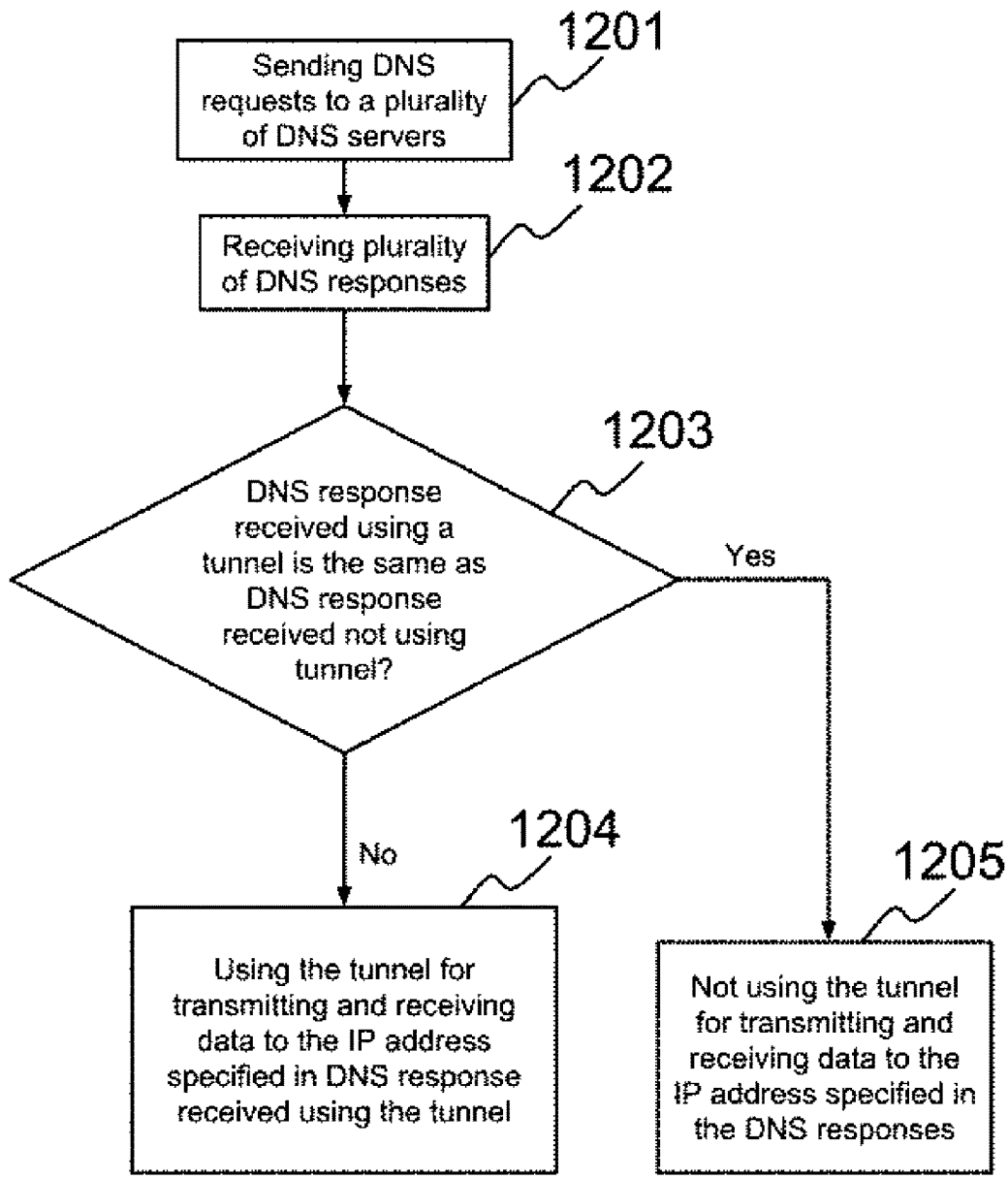
FIG. 12 is a flowchart illustrating a process according to one of the embodiments of the present invention.

FIG. 12 is a flowchart illustrating a process according to one of the embodiments of the present invention. Gateway 101 sends new DNS requests to a plurality of DNS servers in step 1201. At least one of the new DNS requests are sent through the first VPN connection established between gateway 101 and router 600. The new DNS requests are based on a DNS request received by gateway 101 through LAN interface 102. Gateway 101 then receives a plurality of DNS responses in response to the new DNS requests in step 1202. In step 1203, gateway 101 analyzes the contents of the plurality of DNS responses, and determines whether a DNS response received through a VPN connection is the same as a DNS response received without using a VPN connection. If a DNS response received through a VPN connection is the same as a DNS response received without using a VPN connection, gateway 101 does not use the VPN connection in step 1205 for transmitting and receiving data to and from the IP address specified in the DNS responses. Alternatively, if a DNS response received through a VPN connection is not the same as a DNS response received without using a VPN connection, gateway 101 uses the VPN connection in step 1204 for transmitting and receiving data to and from the IP address specified in the DNS response received through the VPN connection.

For example, gateway 101 and DNS server 141 is located in Country A, router 600 and DNS server 601 is located in Country B. In step 1202, a first DNS response is received from DNS server 141 and a second DNS response is received from DNS server 601 through the first VPN connection. Gateway 101 determines in step 1203 whether the first and second DNS responses specify the same IP address. The second DNS response is less likely to be tampered since it is received through a VPN connection. If the first and second DNS responses specify the same IP address, that means that the first DNS response is also less likely to be tampered. This may indicate that there is no regulatory or legal barrier for gateway 101 to access the specified IP address without using a VPN connection, and the communication between gateway 101 and the IP address specified will not be blocked even if no VPN connection is used. The communication of gateway 101 with the specified IP address may be faster if data is transmitted and received directly, instead of through the first VPN connection. For illustration purpose, if the specified IP address is located in Country A, gateway 101 does not need to transmit data to the specified IP address through router 600 in country B, as that would slow down data transmission. Therefore, gateway 101 does not use the VPN connection in step 1205 for transmitting and receiving data to and from the specified IP address.

Alternatively, if gateway 101 determines in step 1203 that the first and second DNS responses specify different IP addresses, the IP address specified in the first DNS response is more likely to be tampered. This is because the second DNS response is considered to less likely to be tampered since it is received through a VPN connection. In this case, the reason why the first DNS response is more likely to be tampered may be that there are regulatory or legal barriers for gateway 101 to access the IP address specified in the second DNS response. Therefore, gateway 101 uses the first VPN connection for transmitting and receiving data to and from the IP address specified in the second DNS response in step 1204, so that the legal or regulatory barriers can be overcome.

In one of the embodiments, gateway 101 receives a plurality of DNS responses from a plurality of DNS servers through the first VPN connection established between gateway 101 and router 600. If the IP addresses specified in the plurality of DNS responses are different, gateway 101 determines which IP address is most suitable to be sent to the host in a new DNS response. The determination may be based on one or more policies. For example, an IP address that is specified in the majority of DNS responses is considered to be most suitable. Alternatively, an IP address specified in a DNS response received from a DNS server with higher priority among other DNS servers is considered to be the most suitable. Alternatively, an IP address specified in a DNS response that is received earliest is considered to be most suitable. Alternatively, an IP address specified in a DNS response that is received from a DNS server selected according to historical statistics is considered to be the most suitable. Gateway 101 then sends a new DNS response to the host based on a DNS response specifying the most suitable IP address.

In one variant, when the plurality of DNS responses are received from a plurality of DNS servers through different VPN connections, an IP address can be considered to be the most suitable based on the priority of the VPN connections or the termination points of the VPN connections.

In one of the embodiments, a plurality of DNS responses are received from a plurality of DNS servers. Some of the DNS responses are received through VPN connection(s) and some are received without using a VPN connection. For example, a first DNS response received without using a VPN connection specifies the same IP address as the majority of DNS responses received through VPN connection(s). A second DNS response received without using a VPN connection specifies an IP address that is different from the IP address specified in majority of DNS responses received through VPN connection(s). Gateway 101 then sends a new DNS response to the host through LAN interface 102 based on the IP address specified in the majority of DNS responses received through VPN connection(s), but gateway 101 determines to transmit and receive data to and from the specified IP address without using a VPN connection, as the IP address specified in first DNS response is the same as the IP address specified in the majority of DNS responses received through VPN connection(s).

Figure 13:
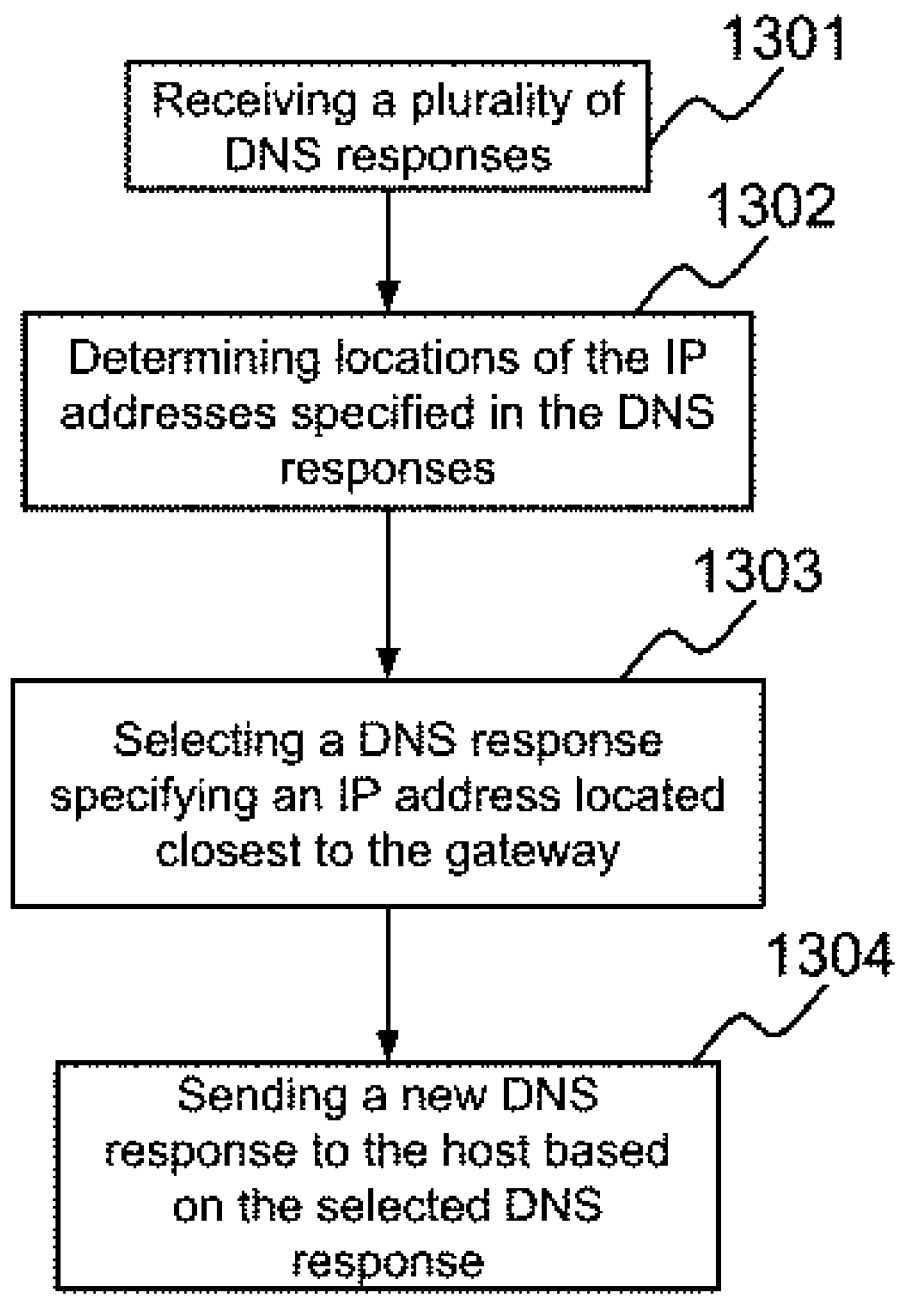
FIG. 13 is a flowchart illustrating a process according to one of the embodiments of the present invention.

FIG. 13 is a flowchart illustrating a process according to one of the embodiments of the present invention. Gateway 101 receives a plurality of DNS responses in step 1301. The plurality of DNS responses are received through VPN connection(s). The plurality of DNS responses are responses to new DNS requests sent by gateway 101, where the new DNS requests are based on a DNS request received by gateway 101 from a host through LAN interface 102. In step 1302, gateway 101 determines the geographical locations of the IP addresses specified in the plurality of DNS responses. Gateway 101 then determines which IP address is located closest to gateway 101, and then selects a DNS response specifying the IP address that is located closest to it in step 1303. A new DNS response based on the selected DNS response is then sent to the host through LAN interface 102 by gateway 101 in step 1304.

Gateway 101 may determine which IP address is located closest to it by determining its own geographical location and the geographical location of the IP address. Gateway 101 may determine its own geographical location by using location sensors, such as a Global Positioning System (GPS) sensor. The determined geographical location information may then be stored in a storage medium of gateway 101, such as computer readable storage medium 506. The GPS sensor may be embedded in gateway 101 or may be embedded in an external device coupled with gateway 101.

Alternatively, the geographical location of gateway 101 is entered by a user or administrator of gateway 101 and then stored in computer readable storage medium 506.

Those skilled in the art would appreciate that a domain name can be resolved to different IP addresses by different DNS servers. The different IP addresses may have different geographical locations but may have provide the resources corresponding to the domain name that are required by a user who sends the DNS request for the domain name. Therefore, it is beneficial for gateway 101 to select a DNS response specifying an IP address that it is closest to, so that it can transmit and receive data to and from the closest IP address.

Those who are skilled in the art would appreciate that the present invention also applies to hostnames. Hostnames may have appended the name of a DNS domain, separated from the host-specific label by a period ("dot"). In the latter form, a hostname is also called a domain name. If the domain name is completely specified, including a top-level domain of the Internet, then the hostname is said to be a fully qualified domain name. Hostnames that include DNS domains are often stored in the Domain Name System together with the IP addresses of the host they represent for the purpose of mapping the hostname to an address, or the reverse process.

It is known to those skilled in the art that a DNS response received from a DNS server is only valid for a specific time period specified by the TTL corresponding to the DNS response. The IP address specified in a DNS response corresponding to a specific domain name or host name can be cached for the specific time period. When the specific time period has expired, a host or gateway 101 may need to send another DNS request for a domain name or host name in order to receive another DNS response corresponding to the specific domain name or host name that contains the updated IP address of the specific domain name.

In one example, according to a preferred embodiment, with respect to FIG. 7, FIG. 8, FIG. 10 and FIG. 12, the host determines the TTL specified in the DNS response and caches the IP address of the first domain name for a time period specified in the TTL. When the time period has expired, the host sends a second DNS request to gateway 101 if the host is still communicating with the first domain name, and consequently, the process is repeated and the IP address in the cache of the host is updated. In this way the IP address can be updated periodically.

In one variant, when the time period specified in the TTL of a first DNS response containing a first IP address expires, gateway 101 deletes the decision corresponding to the first IP address made at step 705 or 706. For example, based on the location of the first IP address, gateway 101 determines to use the first VPN connection for data packets destined to the first IP address in step 705. When the time period expires, the IP address corresponding to the first domain name may change, and the first IP address may not correspond to the first domain name anymore. Therefore, the decision corresponding to the first IP address should be deleted, so that the first VPN connection is not used for data packets destined to the first IP address. When data packets destined to the first IP address arrives at gateway 101, gateway 101 transmits the data packets to the first IP address without using the first VPN connection.

In one variant, according to FIG. 7, when an IP address of the first domain name changes after the specific time period is over, the decision at step 704 may change for the same first domain name. For illustration purpose, the location of a first IP address corresponding to a domain name "±mydomain-.com" is Country X. Based on location Country X, gateway 101 determines in step 704 that it is preferred to use the first VPN connection in step 705. When the specific time period is over, the process of FIG. 7 is repeated when the host sends another DNS request for the domain name "±mydomain-.com". The DNS response received in response to another DNS request contains a second IP address for "±mydomain-.com". The location of the second IP address is determined to be Country Y in step 703. Based on location Country Y, gateway 101 determines in step 704 that it is preferred to not use the first VPN connection in step 706.

In another example, gateway 101 determines the TTL specified in the DNS response and caches the IP address of the first domain name for a time period specified in the TTL. When the time period is over, gateway 101 sends another DNS request to the DNS server and updates the IP address in the cache of gateway 101 corresponding to the first domain name. Therefore, when the host sends a second DNS request for the first domain name to gateway 101, gateway 101 can send a DNS response containing the updated IP address of the first domain name that is in the cache of gateway 101.

In one variant, when gateway 101 has an outbound policy for a first domain name, and the outbound policy is defined by the IP address of the first domain name, gateway 101 sends a DNS request corresponding to the first domain name to at least one DNS server periodically, so that gateway 101 receives DNS responses with the updated IP address of the first domain name. The IP address in the outbound policy is updated by gateway 101 accordingly. In a preferred embodiment, the outbound policy for the first domain name expires when a time period specified in the TTL expires, where the TTL is of a DNS response corresponding to the DNS request. The outbound policy may be deleted from computer readable storage medium 506. A new outbound policy may be created and stored in computer readable storage medium 506 for the first domain name with the updated IP address.

Processing unit 505 executes program instructions to carry out the steps of FIG. 7, FIG. 8, FIG. 9, FIG. 10, FIG. 11, FIG. 12, and FIG. 13. The program instructions are stored in computer readable storage medium 506.

The invention claimed is:

1. A method for processing a Domain Name Services (DNS) request in a gateway, wherein the gateway comprises a plurality of wide area network (WAN) interfaces, comprising:
   a. sending, via one or more WAN interfaces in the plurality of WAN interfaces, a first plurality of DNS requests to a plurality of DNS servers through a plurality of connections, wherein the first plurality of DNS requests are created based on a second DNS request;
   b. receiving one or more first DNS responses within a time threshold;
   c. selecting a second DNS response from the one or more first DNS responses; and
   d. creating and transmitting a third DNS response, wherein the third DNS response is based on the second DNS response and corresponds to the second DNS request.

2. The method of claim 1, wherein the selecting of the second DNS response from the one or more first DNS responses is based on at least one predefined DNS response selection policy.

3. The method of claim 1, wherein the plurality of connections is established through one or more WAN interfaces in the plurality of WAN interfaces.

4. The method of claim 1, wherein the plurality of connections comprises at least one tunnel.

5. The method of claim 1, wherein the plurality of connections comprises at least one access network and at least one tunnel.

6. The method of claim 1, further comprising determining a number of DNS requests in the first plurality of DNS requests wherein the number of DNS requests in the first plurality of DNS requests is equal to number of connections in the plurality of connections.

7. The method of claim 1, wherein the plurality of DNS servers is selected based on accessibility of the plurality of connections.

8. The method of claim 1, wherein the plurality of DNS servers is selected based on at least one predefined DNS server selection policy.

9. The method of claim 1, wherein the first plurality of DNS requests include at least two DNS requests for a DNS server in the plurality of DNS servers.

10. The method of claim 1, wherein at least two DNS requests in the first plurality of DNS requests are sent through different connections in the plurality of connections.

11. A gateway, comprising:
a plurality of network interfaces;
at least one processing unit coupled to the plurality of network interfaces;
at least one main memory coupled to the at least one processing unit;
at least one non-transitory computer readable storage medium coupled to the at least one processing unit and storing program instructions configured to cause the at least one processing unit to perform the steps of:
  a. sending a first plurality of DNS requests to a plurality of DNS servers through a plurality of connections wherein the first plurality of DNS requests are created based on a second DNS request;
  b. receiving one or more first DNS responses within a time threshold;
  c. selecting a second DNS response from the one or more first DNS responses; and
  d. creating and transmitting a third DNS response, wherein the third DNS response is based on the second DNS response and corresponds to the second DNS request.

12. The gateway of claim 11, wherein the selecting of the second DNS response from the one or more first DNS responses is based on at least one predefined DNS response selection policy.

13. The gateway of claim 11, wherein the plurality of connections is established through one or more WAN interfaces in the plurality of network interfaces.

14. The gateway of claim 11, wherein the plurality of connections comprises at least one tunnel.

15. The gateway of claim 11, wherein the plurality of connections comprises at least one access network and at least one tunnel.

16. The gateway of claim 11, wherein the at least one non-transitory computer readable storage medium further stores program instructions configured to cause the at least one processing unit to perform the steps of:
receiving a DNS request through at least one network interface in the plurality of network interfaces; and
sending the second DNS request through a different connection in the plurality of connections.

17. The gateway of claim 11, wherein the plurality of DNS servers is selected based on accessibility of the plurality of connections.

18. The gateway of claim 11, wherein the plurality of DNS servers is selected based on at least one predefined DNS server selection policy.

19. The gateway of claim 11, wherein the first plurality of DNS requests includes at least two DNS requests for a DNS server in the plurality of DNS servers.

20. The gateway of claim 11, wherein at least two DNS requests in the first plurality of DNS requests are sent through different connections in the plurality of connections.

* * * * *